United States Patent
Fox

(10) Patent No.: US 12,446,547 B2
(45) Date of Patent: Oct. 21, 2025

(54) SYSTEM AND METHOD FOR ERADICATING ECTOPARASITES

(71) Applicant: Alyssa Lynn Fox, Marathon, NY (US)

(72) Inventor: Alyssa Lynn Fox, Marathon, NY (US)

( * ) Notice: Subject to any disclaimer, the term of this patent is extended or adjusted under 35 U.S.C. 154(b) by 958 days.

(21) Appl. No.: 17/571,513

(22) Filed: Jan. 9, 2022

(65) Prior Publication Data

US 2022/0217943 A1    Jul. 14, 2022

Related U.S. Application Data

(60) Provisional application No. 63/135,219, filed on Jan. 8, 2021.

(51) Int. Cl.
| | | |
|---|---|---|
| *A01K 13/00* | (2006.01) | |
| *A01M 3/00* | (2006.01) | |
| *A45D 20/12* | (2006.01) | |
| *A45D 20/48* | (2006.01) | |

(52) U.S. Cl.
CPC .......... *A01K 13/002* (2013.01); *A45D 20/124* (2013.01); *A01M 3/007* (2013.01); *A45D 20/48* (2013.01)

(58) Field of Classification Search
CPC ...... A41D 20/12; A41D 20/48; A41D 20/133; A41D 20/124
See application file for complete search history.

(56) References Cited

U.S. PATENT DOCUMENTS

| | | |
|---|---|---|
| 2,557,006 A | 6/1951 | Mehring |
| 3,721,250 A | 3/1973 | Walter |
| 3,903,905 A | 9/1975 | Tucker |
| 3,955,065 A | 5/1976 | Chambon |
| 3,986,272 A | 10/1976 | Feierabent |
| 4,003,388 A | 1/1977 | Nopanen |
| 4,050,469 A | 9/1977 | Lin |
| 4,085,309 A | 4/1978 | Godel |
| 4,114,022 A | 9/1978 | Braulke, III |
| 4,295,283 A | 10/1981 | Tomaro |
| 4,327,278 A | 4/1982 | Tomaro |
| 4,376,441 A | 3/1983 | Duncan |
| 4,380,790 A | 4/1983 | Saferstein |
| 4,557,247 A | 12/1985 | Hara |
| 4,572,188 A | 2/1986 | Augustine |
| 4,671,303 A | 6/1987 | Saferstein |

(Continued)

FOREIGN PATENT DOCUMENTS

| | | |
|---|---|---|
| EP | 0689783 | 1/1996 |
| EP | 0693262 | 1/1996 |

(Continued)

*Primary Examiner* — Kaitlyn E Smith
(74) *Attorney, Agent, or Firm* — Hoffberg & Asociates; Steven M Hoffberg

(57) ABSTRACT

The ectoparasite eradicating device is configured to eradicate lice and eggs by conveying and directing heated air to the base of the hair shaft where lice live and lay egg by connecting to a common commercially available blow dryer. The device includes a rotatable sleeve to facilitate maintenance of contact of the lower concave edge with the scalp over a range of movements of the blow dryer. A plate with a flow disrupting lip separates the hot air flow from the scalp to avoid burning, while ensuring effective treatment of the hair to the root at the edge of the plate.

20 Claims, 14 Drawing Sheets

(56) References Cited

U.S. PATENT DOCUMENTS

| | | |
|---|---|---|
| 4,676,260 A | 6/1987 | Paulhus |
| 4,683,370 A | 7/1987 | Petersen |
| 4,692,594 A | 9/1987 | Martin |
| 4,759,135 A | 7/1988 | Scivoletto |
| 4,815,232 A | 3/1989 | Rawski |
| 4,819,670 A | 4/1989 | Saferstein |
| 4,848,007 A | 7/1989 | Montagnino |
| 4,904,847 A | 2/1990 | Kosaka |
| D307,192 S | 4/1990 | Saferstein |
| 4,927,813 A | 5/1990 | Bernstein |
| 4,955,145 A | 9/1990 | Scivoletto |
| 4,961,283 A | 10/1990 | Forbes |
| 5,067,444 A | 11/1991 | Parker |
| 5,072,746 A | 12/1991 | Kantor |
| 5,078,157 A | 1/1992 | Golan |
| 5,112,515 A | 5/1992 | Buxton |
| 5,157,757 A | 10/1992 | McDougall |
| 5,178,168 A | 1/1993 | Kantor |
| 5,195,253 A | 3/1993 | Poumey |
| 5,235,759 A | 8/1993 | Rizzuto, Jr. |
| 5,261,427 A | 11/1993 | Dolev |
| 5,275,339 A | 1/1994 | Andis |
| 5,287,635 A | 2/1994 | Chan |
| 5,288,483 A | 2/1994 | Cardin |
| 5,292,504 A | 3/1994 | Cardin |
| 5,300,098 A | 4/1994 | Philipot |
| 5,300,101 A | 4/1994 | Augustine |
| 5,300,102 A | 4/1994 | Augustine |
| 5,303,483 A | 4/1994 | Chan |
| D349,585 S | 8/1994 | Rizzuto, Jr. |
| 5,343,881 A | 9/1994 | Golan |
| 5,350,417 A | 9/1994 | Augustine |
| D354,152 S | 1/1995 | Mathews |
| 5,434,946 A | 7/1995 | Barzilai |
| 5,435,327 A | 7/1995 | Ho |
| D365,662 S | 12/1995 | Leman |
| 5,486,205 A | 1/1996 | Cornell |
| 5,488,783 A | 2/1996 | Parkinson |
| D368,342 S | 3/1996 | Founds |
| D369,229 S | 4/1996 | Oberheim |
| 5,526,578 A | 6/1996 | Iyer |
| 5,554,360 A | 9/1996 | Nakamura |
| 5,621,980 A | 4/1997 | Kingsbury |
| 5,628,332 A | 5/1997 | Debourg |
| 5,636,646 A | 6/1997 | Zito |
| 5,649,502 A | 7/1997 | Frank |
| 5,658,750 A | 8/1997 | Sheftel |
| D384,772 S | 10/1997 | Kling |
| 5,674,269 A | 10/1997 | Augustine |
| D392,413 S | 3/1998 | Gudefin |
| 5,727,331 A | 3/1998 | Thaler |
| 5,733,320 A | 3/1998 | Augustine |
| 5,765,292 A | 6/1998 | Chan |
| 5,768,749 A | 6/1998 | Ohi |
| 5,783,202 A | 7/1998 | Tomlinson |
| 5,785,723 A | 7/1998 | Beran |
| 5,829,157 A | 11/1998 | Gittens |
| 5,858,383 A | 1/1999 | Precopio |
| 5,875,282 A | 2/1999 | Jordan |
| 5,876,428 A | 3/1999 | Van Duren |
| 5,887,357 A | 3/1999 | McNair |
| 5,918,607 A | 7/1999 | Zucker |
| 5,937,139 A | 8/1999 | Peterson |
| 5,953,829 A | 9/1999 | Van den Brug |
| D414,896 S | 10/1999 | Goetschi |
| 5,968,084 A | 10/1999 | Augustine |
| 5,968,507 A | 10/1999 | Upton |
| 5,972,987 A | 10/1999 | Reid |
| 5,977,186 A | 11/1999 | Franklin |
| 5,997,846 A | 12/1999 | Burns |
| 5,997,847 A | 12/1999 | Spiesel |
| 6,006,758 A | 12/1999 | Thorne |
| 6,053,180 A | 4/2000 | Kwan |
| 6,063,771 A | 5/2000 | Snyder |
| 6,086,682 A | 7/2000 | Anderson |
| D433,182 S | 10/2000 | Kwong |
| 6,126,681 A | 10/2000 | Van Duren |
| 6,130,253 A | 10/2000 | Franklin |
| 6,139,859 A | 10/2000 | Precopio |
| 6,141,901 A | 11/2000 | Johnson |
| 6,143,020 A | 11/2000 | Shigezawa |
| 6,146,411 A | 11/2000 | Noda |
| 6,146,412 A | 11/2000 | Van Duren |
| 6,158,443 A | 12/2000 | Leman |
| 6,169,850 B1 | 1/2001 | Menassa |
| D441,136 S | 4/2001 | Leman |
| 6,254,337 B1 | 7/2001 | Arnold |
| 6,262,031 B1 | 7/2001 | Larouche |
| 6,265,384 B1 | 7/2001 | Pearlman |
| 6,266,893 B1 | 7/2001 | Standley |
| 6,269,549 B1 | 8/2001 | Carlucci |
| 6,303,581 B2 | 10/2001 | Pearlman |
| 6,342,253 B1 | 1/2002 | Whitledge |
| 6,342,482 B1 | 1/2002 | Snyder |
| 6,350,724 B1 | 2/2002 | Kiel |
| 6,350,734 B1 | 2/2002 | Pearlman |
| 6,355,915 B1 | 3/2002 | Ziaimehr |
| 6,357,491 B1 | 3/2002 | Buchanan |
| 6,386,845 B1 | 5/2002 | Bedard |
| 6,408,533 B2 | 6/2002 | Sakamoto |
| 6,425,403 B1 | 7/2002 | Lin Lu |
| D462,141 S | 8/2002 | Carlucci |
| 6,440,157 B1 | 8/2002 | Shigezawa |
| 6,440,388 B1 | 8/2002 | Burns |
| 6,485,734 B1 | 11/2002 | Baker |
| 6,524,604 B1 | 2/2003 | Ozelkan |
| 6,541,455 B2 | 4/2003 | Pearlman |
| 6,541,740 B2 | 4/2003 | Ziaimehr |
| 6,565,665 B2 | 5/2003 | Altschuler |
| 6,572,333 B2 | 6/2003 | Fujinaka |
| D477,112 S | 7/2003 | Yeung |
| 6,588,140 B1 | 7/2003 | Johnson |
| 6,596,291 B2 | 7/2003 | Bell |
| 6,607,716 B1 | 8/2003 | Smith |
| 6,637,440 B2 | 10/2003 | de Laforcade |
| 6,663,860 B1 | 12/2003 | Tvedten |
| 6,663,876 B2 | 12/2003 | Campbell |
| 6,678,994 B2 | 1/2004 | Topp |
| 6,685,969 B2 | 2/2004 | Van Scoik |
| 6,689,079 B2 | 2/2004 | Flick |
| 6,689,394 B2 | 2/2004 | Van Scoik |
| 6,691,713 B1 | 2/2004 | Altschuler |
| D487,945 S | 3/2004 | Anthony |
| 6,701,552 B2 | 3/2004 | Suzuki |
| 6,727,228 B2 | 4/2004 | Janssen |
| D490,185 S | 5/2004 | Hegner |
| 6,745,996 B1 | 6/2004 | Guthrie |
| D493,571 S | 7/2004 | Jenkins |
| 6,793,931 B2 | 9/2004 | Precopio |
| 6,827,729 B2 | 12/2004 | Gammons |
| 6,876,884 B2 | 4/2005 | Hansen |
| 6,936,269 B2 | 8/2005 | Robinson |
| 6,974,584 B2 | 12/2005 | Bessette |
| 7,030,095 B2 | 4/2006 | Janssen |
| 7,037,068 B2 | 5/2006 | Cobb |
| 7,040,037 B2 | 5/2006 | Keong |
| 7,047,660 B2 | 5/2006 | Leventhal |
| 7,064,108 B2 | 6/2006 | Guzzo |
| D524,983 S | 7/2006 | Smith |
| 7,089,945 B1 | 8/2006 | Barge |
| 7,090,833 B2 | 8/2006 | Coleman |
| 7,178,261 B2 | 2/2007 | McCambridge |
| 7,220,273 B2 | 5/2007 | Van Duren |
| 7,264,004 B2 | 9/2007 | Djulbegovic |
| 7,282,211 B2 | 10/2007 | Ping |
| 7,294,342 B2 | 11/2007 | Precopio |
| 7,357,939 B2 | 4/2008 | Bessette |
| 7,361,366 B2 | 4/2008 | Bessette |
| 7,389,779 B2 | 6/2008 | Chan |
| 7,393,528 B2 | 7/2008 | Tvedten |
| 7,412,781 B2 | 8/2008 | Mattinger |
| 7,484,466 B2 | 2/2009 | Kuki |
| 7,789,902 B2 | 9/2010 | Clayton |
| 7,984,059 B2 | 7/2011 | Levine |

(56) References Cited

U.S. PATENT DOCUMENTS

| | | |
|---|---|---|
| 8,118,036 B2 | 2/2012 | Wang |
| 8,122,896 B2 * | 2/2012 | Obermann ............ A45D 20/122 |
| | | 132/901 |
| 8,475,510 B2 | 7/2013 | Simon |
| 10,575,616 B2 | 3/2020 | Riazor Vilches |
| 10,959,734 B2 | 3/2021 | Fung |
| 2004/0126403 A1 | 7/2004 | Van Scoik |
| 2004/0126435 A1 | 7/2004 | Van Scoik |
| 2005/0013727 A1 | 1/2005 | Hedman |
| 2005/0051190 A1 | 3/2005 | Bachrach |
| 2005/0261740 A1 | 11/2005 | Clayton |
| 2006/0130393 A1 | 6/2006 | Clayton |
| 2007/0068544 A1 | 3/2007 | Hackl |
| 2008/0193387 A1 | 8/2008 | De Wolff |
| 2008/0212312 A1 | 9/2008 | Kaufinann |
| 2008/0214657 A1 | 9/2008 | Spring |
| 2010/0049285 A1 * | 2/2010 | Clayton ................ A61L 2/0023 |
| | | 607/104 |
| 2010/0049286 A1 | 2/2010 | Thorsen |
| 2010/0071713 A1 * | 3/2010 | Simon .................... A45D 24/30 |
| | | 132/115 |
| 2010/0086577 A1 | 4/2010 | Munoz |
| 2010/0145417 A1 | 6/2010 | Kaufmann |
| 2010/0331931 A1 | 12/2010 | Clayton |
| 2011/0118196 A1 | 5/2011 | Chazot |
| 2013/0284111 A1 | 10/2013 | Simon |
| 2013/0312780 A1 | 11/2013 | Rafaeli |
| 2014/0013653 A1 | 1/2014 | Lander |
| 2016/0018100 A1 | 1/2016 | Batt |
| 2016/0051027 A1 * | 2/2016 | Skinner ................. A45D 20/14 |
| | | 607/107 |
| 2018/0255901 A1 | 9/2018 | Riazor Vilches |
| 2020/0268124 A1 | 8/2020 | Kenigsbuch |

FOREIGN PATENT DOCUMENTS

| | | |
|---|---|---|
| EP | 1036522 | 9/2000 |
| EP | 2326200 | 6/2011 |
| ES | 1094613 | 11/2013 |
| WO | WO9010432 | 9/1990 |
| WO | WO9105561 | 5/1991 |
| WO | WO9115953 | 10/1991 |
| WO | WO9116032 | 10/1991 |
| WO | WO9416665 | 8/1994 |
| WO | WO9830124 | 7/1998 |
| WO | WO9935498 | 7/1999 |
| WO | WO9952410 | 10/1999 |
| WO | WO9966790 | 12/1999 |
| WO | WO0000213 | 1/2000 |
| WO | WO0019857 | 4/2000 |
| WO | WO0042982 | 7/2000 |
| WO | WO0054816 | 9/2000 |
| WO | WO0062613 | 10/2000 |
| WO | WO0072814 | 12/2000 |
| WO | WO0152689 | 7/2001 |
| WO | WO0178750 | 10/2001 |
| WO | WO02089584 | 11/2002 |
| WO | WO03045145 | 6/2003 |
| WO | WO03056972 | 7/2003 |
| WO | WO03057231 | 7/2003 |
| WO | WO03066009 | 8/2003 |
| WO | WO03092583 | 11/2003 |
| WO | WO2005007188 | 1/2005 |
| WO | WO2005079563 | 9/2005 |
| WO | WO2005107453 | 11/2005 |
| WO | WO2005113060 | 12/2005 |
| WO | WO2006017263 | 2/2006 |
| WO | WO2006026806 | 3/2006 |
| WO | WO2006071248 | 7/2006 |
| WO | WO2006125160 | 11/2006 |
| WO | WO2006137141 | 12/2006 |
| WO | WO2007056813 | 5/2007 |
| WO | WO2007104345 | 9/2007 |
| WO | WO2008007055 | 1/2008 |
| WO | WO2008022386 | 2/2008 |
| WO | WO2008022387 | 2/2008 |
| WO | WO2008038108 | 4/2008 |
| WO | WO2008067054 | 6/2008 |
| WO | WO2008087148 | 7/2008 |
| WO | WO2008122837 | 10/2008 |

* cited by examiner

SYSTEM AND METHOD FOR ERADICATING ECTOPARASITES

CROSS REFERENCE TO RELATED APPLICATIONS

The present application is a non-provisional under 35 U.S.C. § 119(e), and claims benefit of priority from, U.S. Provisional Patent Application No. 63/135,219, filed Jan. 8, 2021, the entirety of which is expressly incorporated herein by reference.

FIELD OF INVENTION

This disclosure generally relates to an air conveying device and methods used to kill lice and lice eggs at the base of the hair shafts. More particularly this disclosure relates to a device that utilizes heated air to kill lice and lice eggs.

BACKGROUND OF THE INVENTION

The statements in this section merely provide background information related to the present disclosure and may not constitute prior art. All references cited herein are expressly incorporated herein by reference in their entirety.

Head lice is a parasitic insect that infects between 6 million to 12 million people a year in the United States and are typically found on the head, eyebrows, and eyelashes of humans. Although head lice can be found on virtually any human, they are most commonly found on children ages three to eleven attending preschool, or elementary school. This is likely due to the proximity and constant contact children have with each other in a school setting. Because head lice prefer warm humid environments, and do not live long without a blood supply, the most likely form of transmission is head-to-head or hair-to-hair contact and less likely due to the use of shared combs, brushes, towels, bedding or clothing. Lice are part of the ectoparasite family and are no larger than a sesame seed. According to the Centers for Disease Control and Prevention (CDC), nits (eggs) that are laid by the adult female louse are so small (about the size of pin head) that they are difficult to see with the naked eye and are often confused with dandruff. Nits are not laid directly on the scalp, but near the base of the hair shaft where they can easily find a food source when they hatch. They are very difficult to remove from the hair shaft because they are essentially glued to the hair when the eggs are laid.

The misconception of anyone who has not yet experienced a head lice infestation, is that the lice fly or jump from person to person, that the parasite is only attracted to dirty hair and that the entire household will be infected in a matter of seconds. The truth is that the degree of cleanliness and hygiene have very little or nothing to do with a lice infestation. Lice don't fly or jump, they crawl and they crawl fast. It is very difficult to find an adult louse scurrying around on the scalp of someone with a lot of hair because they are quick and will most likely be out of site before you have a chance to separate the hair. The key in determining an infestation of lice is knowing the locations of the scalp where they prefer to live and lay their eggs, which is behind the ears and on the neck. These areas of the scalp are both warm and humid which creates the perfect environment for lice to maintain body temperature and thrive. Head lice prefer environments that are of a favorable humidity and range in the temperature of 82 to 86 degrees Fahrenheit.

After treatment it can be difficult to determine if there is still an active infestation because even after the nits are dead or hatched, the egg will remain glued to the hair shaft until it is physically removed by a nit comb or the glue dries up and they fall off. However, the location of the nit on the hair shaft can be a good indicator of a current or past infestation. According to a "Human Lice" publication by the Texas A&M AgriLife Extension Service, lice lay their eggs within 1 cm of the scalp, and human hair grows, on average, about ⅛" per week. If it takes about 7 days for nits to hatch, it can be assumed that if a nit is found more than ¼" from the scalp it is likely from a past infestation and the egg is either empty or dead.

According to the CDC, the recommended treatment for a person diagnosed with an active infestation is the use of over the counter (OTC) drugs or prescription medication. These medications, also called pediculicides, are most effective on lice, unless they have a strong ovicidal effect, then the nits have higher probability of being eradicated as well. In most cases retreatment is recommended, regardless of the strength of the ovicidal. According to an article published by the National Library of Medicine, studies have shown that due to the anatomy and physiology of head lice, they have become resistant to the most commonly used pediculicides. Because pediculicides are not 100% effective, an alternative treatment recommended by some experts, include the manual removal of nits that are near the base of the hair shaft with the with a nit comb. Nit combs are used to comb the hair to remove nits and lice every 2-3 days over a 2-3 week period. The effectiveness of the nit comb is impacted by the hair type and thickness as the tight spacing of the comb's teeth can induce a high degree of discomfort limiting the amount of the scalp treated.

A louse is a wingless insect which lives on warm-blooded hosts, including humans. Head lice, body lice and pubic lice may suck blood from the host, or even chew the skin of the host. Human head lice tend to live, feed, and lay their eggs (nits), within a distance of about 6 mm from the human scalp, where the conditions of temperature and humidity, as well as the proximity to their source of food is ideal for their survival. Female lice typically attach their eggs, the nits, to the base of the hair shaft within the 6 mm distance from the scalp. Nits hatch into nymphs and mature to become adult lice within a few weeks, at which point the female adult louse can lay eggs.

Head lice cannot hop or fly, but they can crawl very fast along a hair shaft. The greatest risk for exposure to infestation by head lice is head-to-head contact with a person who has a head lice infestation. Another risk, but a lesser one, is the shared use of personal items, such as bedding, towels, hats, scarves and hair brushes, as head lice can survive on a human host for approximately 30 days, but they generally cannot survive longer than 24 hours off the host. Once a lice infestation begins, it can become full-blown very quickly, as the female louse can lay several hundred eggs during her 30-day life span. The lice and nits further prove to be very resilient and difficult to get rid of. Lice have six legs equipped with claws with which they grip a strand of hair tightly. The female louse lays each egg into a glue-like casing on the hair shaft which firmly cements each nit to the strand of hair. Neither the lice nor the nits are easily dislodged from the hair.

Head lice are wingless insects that spend their entire lives on the human scalp and feeding exclusively on human blood. Humans are the only known hosts of this specific parasite, while chimpanzees host a closely related species,

*Pediculus schaeffi*. Other species of lice infest most orders of mammals and all orders of birds. en.wikipedia.org/wiki/Head_louse Lice differ from other hematophagic ectoparasites such as fleas in spending their entire lifecycle on a host. Head lice cannot fly, and their short, stumpy legs render them incapable of jumping, or even walking efficiently on flat surfaces.

The non-disease-carrying head louse differs from the related disease-carrying body louse (*Pediculus humanus humanus*) in preferring to attach eggs to scalp hair rather than to clothing. The two subspecies are morphologically almost identical, but do not normally interbreed. From genetic studies, they are thought to have diverged as subspecies about 30,000-110,000 years ago, when many humans began to wear a significant amount of clothing. A much more distantly related species of hair-clinging louse, the pubic or crab louse (*Pthirus pubis*), also infests humans. It is morphologically different from the other two species and is much closer in appearance to the lice which infest other primates. Louse infestation of the body is known as pediculosis, pediculosis capitis for head lice, pediculosis corporis for body lice, and phthiriasis for pubic lice.

Head lice (especially in children) have been, and still are, subject to various eradication campaigns. Unlike body lice, head lice are not the vectors of any known diseases, however rare secondary infections can result from scratching at bites. Head louse infestations may be beneficial in helping to foster a natural immune response against lice which helps humans in defense against the far more dangerous body louse, which is capable of transmitting dangerous diseases.

Like other insects of the suborder Anoplura, adult head lice are small (2.5-3 mm long), dorsoventrally flattened (see anatomical terms of location), and wingless.[8] The thoracic segments are fused, but otherwise distinct from the head and abdomen, the latter being composed of seven visible segments. Head lice are grey in general, but their precise color varies according to the environment in which they were raised. After feeding, consumed blood causes the louse body to take on a reddish color. One pair of antennae, each with five segments, protrudes from the insect's head. Head lice also have one pair of eyes. Eyes are present in all species within the Pediculidae family, but are reduced or absent in most other members of the Anoplura suborder. Like other members of the Anoplura, head louse mouthparts are highly adapted for piercing the skin and sucking blood. These mouth parts are retracted into the insect's head except during feeding.

Six legs project from the fused segments of the thorax. As is typical in the Anoplura, these legs are short and terminate with a single claw and opposing "thumb". Between its claw and thumb, the louse grasps the hair of its host. With their short legs and large claws, lice are well adapted to clinging to the hair of their host. These adaptations leave them incapable of jumping, or even walking efficiently on flat surfaces. Lice can climb up strands of hair very quickly, allowing them to move quickly and reach another host.

Like most insects, head lice are oviparous. Females lay about three or four eggs per day. Louse eggs (wrongly named also nits, see below), are attached near the base of a host hair shaft. Eggs are usually laid on the base of the hair, i.e., 3-5 mm off the scalp surface. In warm climates, and especially the tropics, eggs may be laid 6 inches (15 cm) or more down the hair shaft. To attach an egg, the adult female secretes a glue from her reproductive organ. This glue quickly hardens into a "nit sheath" that covers the hair shaft and large parts of the egg except for the operculum, a cap through which the embryo breathes. The glue was previously thought to be chitin-based, but more recent studies have shown it to be made of proteins similar to hair keratin. Each egg is oval-shaped and about 0.8 mm in length. They are bright, transparent, and tan to coffee-colored so long as they contain an embryo, but appear white after hatching. Head lice hatch typically six to nine days after oviposition.

After hatching, the louse nymph leaves behind its egg shell (usually known as a "nit", see below), still attached to the hair shaft. The empty egg shell remains in place until physically removed by abrasion or the host, or until it slowly disintegrates, which may take 6 or more months.

Head lice, like other insects of the order Phthiraptera, are hemimetabolous. Newly hatched nymphs will moult three times before reaching the sexually-mature adult stage. Thus, mobile head lice populations may contain eggs, nits, three nymphal instars, and the adults (male and female) (imago). Metamorphosis during head louse development is subtle. The only visible differences between different instars and the adult, other than size, is the relative length of the abdomen, which increases with each molt., as well as the existence of reproductive organs in the adults. Aside from reproduction, nymph behavior is similar to the adult. Like adults, nymphs feed also only on human blood (hematophagia), and cannot survive long away from a host. Outside their hosts lice can't survive more than 24 hrs. The time required for head lice to complete their nymph development to the imago lasts for 12-15 days. Nymph mortality in captivity is about 38%, especially within the first two days of life. In the wild, mortality may instead be highest in the third instar. Nymph hazards are numerous. Failure to completely hatch from the egg is invariably fatal. Death during molting can also occur, although it is reportedly uncommon. During feeding, the nymph gut can rupture, dispersing the host's blood throughout the insect body. This results in death within a day or two. During its lifespan of 4 weeks a female louse lays 50-150 eggs. Eggs hatch within 6-9 days, each nymphal stage lasts for 4-5 days and accordingly the period from egg to adults lasts for 18-24 days. Adult lice live for an additional 3-4 weeks. All stages except eggs are blood-feeders and bite the skin four to five times daily to feed. They inject saliva which contains an anticoagulant and suck blood. The digested blood is excreted as dark red frass.

Although any part of the scalp may be colonized, lice favor the nape of the neck and the area behind the ears, where the eggs are usually laid. Head lice are repelled by light and move towards shadows or dark-colored objects in their vicinity.

Buxton, Patrick A. (1947). "The biology of *Pediculus humanus*". The Louse; an account of the lice which infest man, their medical importance and control (2nd ed.). London: Edward Arnold. pp. 24-72.

Maunder, J. W. (1983). "The Appreciation of Lice". Proceedings of the Royal Institution of Great Britain. 55: 1-31.

Buxton, Patrick A. (1947). "The crab louse *Pthirus pubis*". The Louse; an account of the lice which infest man, their medical importance and control (2nd ed.). London: Edward Arnold. pp. 136-141.

Rozsa, L; Apari, P. (2012). "Why infest the loved ones—inherent human behaviour indicates former mutualism with head lice" (PDF). Parasitology. 139 (6): 696-700. doi:10.1017/s0031182012000017. PMID 22309598. S2CID 206247019.

Buxton, Patrick A. (1947). "The Anoplura or Sucking Lice". The Louse; an account of the lice which infest man, their medical importance and control (2nd ed.). London: Edward Arnold. pp. 1-4.

Buxton, Patrick A. (1947). "The Anatomy of *Pediculus humanus*". The Louse; an account of the lice which infest man, their medical importance and control (2nd ed.). London: Edward Arnold. pp. 5-23.

"Lice (Pediculosis)". The Merck Veterinary Manual. Whitehouse Station, N J USA: Merck & Co. 2008. Retrieved 2008-10-08.

Meinking, Terri Lynn (May-June 1999). "Infestations". Current Problems in Dermatology. 11 (3): 75-118. doi:10.1016/S1040-0486(99)90005-4.

Burgess, I. F. (1995). "Human lice and their management". Advances in Parasitology Volume 36. Advances in Parasitology. 36. pp. 271-342. doi:10.1016/50065-308X(08)60493-5. ISBN 978-0-12-031736-3. PMID 7484466.

Pollack R J, Kiszewski A E, Spielman A (August 2000). "Overdiagnosis and consequent mismanagement of head louse infestations in North America". The Pediatric Infectious Disease Journal. 19 (8): 689-93, discussion 694. doi:10.1097/00006454-200008000-00003. PMID 10959734. S2CID 2557006.

Burgess, I. F. (2004). "Human lice and their control". Annu. Rev. Entomol. 49: 457-81. doi:10.1146/annurev.ento.49.061802.123253. PMID 14651472.

"How to get rid of head lice". 25 Dec. 2021. Retrieved 5 Aug. 2021.

"Back to school herbalism—natural ways to nuke nits". Irish Examiner. 1 Sep. 2018. Retrieved 23 Dec. 2018.

Mumcuoglu K Y, Pollack R J, Reed D L, Barker S C, Gordon S, Toloza A C, Picollo M I, Taylan-Ozkan A, Chosidow O, Habedank B, Ibarra J, Meinking T L, Vander Stichele R H (March 2020). "International recommendations for an effective control of head louse infestations". International Journal of Dermatology. 60 (3): 272-80. doi:10.1111/ijd.15096. PMC 7984059. PMID 32767380.

Bacot, A. (1917). "Contributions to the bionomics of *Pediculus humanus* (vestimenti) and *Pediculus capitis*". Parasitology. 9 (2): 228-258. doi:10.1017/S0031182000006065.

Mumcuoglu K Y (May 2006). "Effective treatment of head louse with pediculicides". Journal of Drugs in Dermatology. 5 (5): 451-2. PMID 16703782.

Weems, Jr., H. V.; Fasulo, T. R. (June 2007). "Human Lice: Body Louse, *Pediculus humanus humanus* Linnaeus and Head Louse, *Pediculus humanus* capitis De Geer (Insecta: Phthiraptera (=Anoplura): Pediculidae)". University of Florida, Institute of Food and Agricultural Sciences. Retrieved 2008 Feb. 21.

Nuttall, George H. F. (1919). "The biology of *Pediculus humanus*, Supplementary notes". Parasitology. 11 (2): 201-221. doi:10.1017/s0031182000004194.

Mumcuoglu K Y, Barker S C, Burgess I E, et al. (April 2007). "International guidelines for effective control of head louse infestations". Journal of Drugs in Dermatology. 6 (4): 409-14. PMID 17668538.

Various compositions, devices and methods have been devised to treat the head louse, the most common of which include pediculicides (substances used to treat lice, e.g., shampoos containing an insecticide) and fine-toothed nit combs.

Since the introduction of pediculicides to the lice-treatment market, lice have adapted and become resistant to some of the chemicals that once reliably killed them. Removal of lice and eggs from the head by fine-toothed comb is tedious, time-consuming, and often ultimately frustrating, as the efficacy of this treatment is highly dependent on the skill and meticulousness of the treatment provider. Due to the difficulties of treatment, head lice infestations cause inconvenience to millions of people each year, particularly when they occur among kindergarten and school-age children among whom head lice infestations can spread quickly.

Biologically, lice and nits cannot survive exposure to a blast of hot air for even a fraction of a second. When exposed to gradual heating, lice may have the opportunity to secrete hormones to increase their resistance to heat and their endurance in an overheated environment. In contrast, when lice and nits are exposed to a short pulse of extreme heat, their biological systems are overwhelmed by the mass of hot air, and they experience thermal shock. Following heat blast treatment on lice and nits, the shell of the louse shrinks and deforms, and the proteins in the body inside the shell undergo a process of coagulation, such as occurs to animal proteins cooked at high temperatures.

In an ordinary combing operation using the parasite eradicating device, lice and nits in an infestation area are exposed to a blast of hot air as the strands of hair on which they are located pass between the combing teeth of the device. The lice and nits are caught in the barrage of hot air propelled from each airflow outlet nozzle to its facing intake aperture in the spaces between the combing teeth. The lice are killed instantly or critically damaged by the blast of heat, and the nits are rendered non-viable, and will not hatch.

U.S. Pat. No. 5,261,427 discloses a lice comb device containing a blower heater, to heat and direct a stream of heated air toward a set of comb teeth attached to the device housing.

U.S. Pat. No. 5,261,427 discloses a comb by which it is possible to blow hot air steam through the teeth of the comb when the comb is run though the hair. The temperature of the steam and/or the chemical or natural agent added to the steam will kill the lice and nits when the comb is pulled though the hair.

US 20060130393 discloses a method of eliminating an ectoparasite infestation that includes steps of defining a target area on an animal having an ectoparasite infestation, heating a volume of air, and applying the heated air to the target area with an airflow.

CH 272949A already discloses an applicator that provides an air flow for treating animals with lice infestation, in order to substantially eliminate both the lice and the nits on the animal, and which essentially comprises a base applicator designed to be coupled to a blower, an applicator tip connected to the base applicator and a plurality of fingers on the applicator tip that act as ports to supply an air flow, since it is open on the same side, such that the applicator tip substantially supplies the entire air flow to a single input side of the applicator. Moreover, the applicator tip is dismountable.

EP2326200 also discloses an applicator designed to distribute an air flow to treat a subject with lice infestation, which, although it presents certain improvements with respect to the preceding document, is still based on a pronged applicator that is coupled to a blower equipped with a resistance, i.e., it is a hair drier thanks to which the parasites become dehydrated and die.

US 20180255901 discloses an apparatus for removing head lice consisting of a base comprising a drier, formed by a blower or turbine equipped with a resistance that expels air, coupled to an applicator with a dismountable pronged tip, and, further comprises a suction device formed by a second turbine, which in this case aspirates air, coupled to an applicator equipped with a dismountable tip in the form of a nozzle. The apparatus is equipped with two separate compartments in the casing that forms the base, wherein one houses the drier, i.e., the motor plus the resistance, and the other houses the suction device. The suction device makes it possible to clean the hair and eliminate the already dead, dehydrated head lice that still remain therein, together with the nits. To this end, the suction device comprises a "nit-removing comb", or very fine comb coupled to the applicator nozzle, which completely removes any remaining head lice or nits from the hair. The device allows for the simultaneous use of both elements, such that the drier may utilize the heat generated by the suction device motor and use it for the blower, without switching on the resistance thereof; consequently, the device is not using a drier, but a "blower", which utilizes the heat from the suction device motor to dehydrate the head lice, provided that both systems are used simultaneously.

US 20200268124 provides a parasite eradicating device configured for eradicating parasites by producing a high-temperature airflow, directing it in a stream at an infestation area where parasites thrive, and suctioning the airflow away from the infestation area, such that the parasites are killed and their eggs rendered nonviable by the heat of the airflow.

U.S. Pat. No. 7,789,902 provides a method of eliminating an ectoparasite infestation including defining a target area on an animal having an ectoparasite infestation, heating a volume of air to a temperature to form heated air, applying the heated air to the target area with an airflow such that the heated air impinges directly on substantially all ectoparasites located within the target area, and maintaining the heated air at the target area for a period of time sufficient to affect an ectoparasite mortality rate of at least 50%.

U.S. Pat. No. 8,475,510 discloses airflow applicators for delivering directional, heated air to, for example, the scalp and hair of humans and/or animals to eliminate ectoparasites, such as lice and lice eggs. In preferred embodiments, the applicators are configured to deliver heated airflow (from a separate device, or from another portion of a single device, that generates heated airflow) efficiently right to where ectoparasites and their eggs most frequently reside. Also disclosed are treatment methods, including preferred treatment patterns, for delivering heated airflows for use in eliminating ectoparasites and their eggs on an animal.

A blast of hot air having a high temperature in a range between 80° C. and 120° C. can exterminate/damage a louse in a fraction of a second. The parasite eradicating device according to the present disclosure can be configured so that the amount of time that parasites and nits can be exposed to the high-temperature airflow during combing operation, is sufficient for extermination of the parasites and nits exposed to the stream of hot air.

To maximize efficacy, the barrage of hot air propelled from an airflow outlet nozzle to a neighboring intake aperture can occur in close proximity to the infestation area surface, such as a range of 0-6 mm from the infestation area surface, and practically, from the distal end of the respective combing tooth. In a parasite infestation, the greatest concentration of parasites and nits can be found in this range of distance from the infestation area surface, where the conditions of temperature and humidity, as well as the proximity to their source of food is ideal for their survival and prosperity.

However, such high temperatures risk damage to the scalp.

A spacer can be a heat insulating element formed of a non-thermal conductive material, integral or integrated with an operational combing tooth and forming a separation between the operational combing tooth and the infestation area surface when the hand-held unit is brought as close as possible to the infestation area surface. The spacer can be integral with at least the distal end of the combing tooth, or integrated therewith. A spacer can also be an auxiliary combing tooth, located in a position adjacent to an operational combing tooth, so that when the hand-held unit is brought as close as possible to the infestation area surface, the auxiliary combing tooth comes into contact with the infestation area surface, but the operational combing tooth does not come into contact with the infestation area surface.

A spacer may have active cooling. The spacer can be formed of tubing made of a thermally conductive material, surrounding the distal end of the operational combing tooth in close proximity thereto, and forming part of a closed circuit through which coolant fluid can flow and draw heat away from the infestation area surface. The cooling fluid can absorb heat as it flows in the tubing around the distal end of an operational combing tooth near the infestation area surface, and can dissipate heat over the distance it flows through the circuit after flowing away from the infestation area surface. Alternatively, heat can be actively removed at an area remote from the infestation area surface, and the cooling fluid can be re-cooled and recirculated by the cooling system.

The temperature can be reduced by reducing the heat being delivered to the device in the vicinity of the temperature sensor. This can be accomplished, for example, by causing an automatic shut-off of the device, or by causing the heating element to turn off. In another example, the temperature sensed by the temperature sensor can be reduced by increasing the heat removal rate in the vicinity of the temperature sensor. This can be accomplished, for example, by causing an increase in the rate of suction flow suctioning hot air through at least the airflow intake aperture disposed at the location of the temperature sensor where the temperature was detected to rise above the allowable temperature threshold.

Likewise, when a detected temperature is determined to be lower than a pre-defined threshold value, the device can be configured to respond in such a way as to increase the flow of hot air at least where the temperature was detected to be below a minimum threshold value necessary for treatment. If the temperature remains lower than a pre-defined threshold value for a period of time exceeding a pre-defined duration, the device can be configured to shut down and to alert the user of an apparent malfunction preventing the temperature of the airflow from rising high enough so that effective treatment can be provided. Device can be preset to 3-6 treatment levels as option for the user to pre-define the treatment level of delivered energy (temperature and flow rate) to kill lice (aggressive, effective or gentle etc.)

A steam treatment of the hair near the scalp may damage the hair. It can also be difficult to direct enough steam into thick and curly hair to obtain the necessary temperature to kill the lice and nits that are near the hair roots, without applying too much steam and then either burning the scalp or damaging the hair.

Heat treatments can also be carried out by using a hair drying system comprising a cap which is connected to blowing and heating means. U.S. Pat. Nos. 5,829,157 and 5,887,357 discloses a cap for hair drying that can be used for heat treatment against lice and nits. However, practical experience has shown that heat treatment by the use of traditional hair drying caps against lice is poor due to the capability of the lice to adapt to the high temperatures under the cap. The ability of the lice to adapt and regulate to high temperatures are due to their exo-skeleton, which means that the skeleton is located on the outside on the lice.

See, 20200268124; 20180255901; 20140013653; 20130312780; 20100331931; 20180255901; 20160018100; 20110118196; 20100145417; 20100086577; 20100049286; 20080212312; 20080193387; U.S. Pat. Nos. 10,575,616; 8,475,510; 6,053,180; 8,475,510; US 20100071713 A1; Mar. 25 2010;; U.S. Pat. No. 3,721,250; 3,903,905; 3,955,065; 3,986,272; 4,003,388; 4,050,469; 4,085,309; 4,114,022; 4,295,283; 4,327,278; 4,376,441; 4,380,790; 4,557,247; 4,572,188; 4,671,303; 4,676,260; 4,683,370; 4,692,594; 4,759,135; 4,815,232; 4,819,670; 4,848,007; 4,904,847; D307192; 4,927,813; 4,955,145; 4,961,283; 5,067,444; 5,072,746; 5,078,157; 5,112,515; 5,157,757; 5,178,168; 5,195,253; 5,235,759; 5,261,427; 5,275,339; 5,287,635; 5,288,483; 5,292,504; 5,300,098; 5,300,101; 5,300,102; 5,303,483; D349585; 5,343,881; 5,350,417; D354,152; 5,434,946; D365,662; 5,486,205; 5,488,783; D368,342; D369,229; 5,526,578; 5,554,360; 5,621,980; 5,628,332; 5,636,646; 5,649,502; 5,658,750; D384,772; 5,674,269; D392,413; 5,727,331; 5,733,320; 5,765,292; 5,768,749; 5,783,202; 5,785,723; 5,858,383; 5,875,282; 5,876,428; 5,918,607; 5,937,139; 5,953,829; D414,896; 5,968,084; 5,968,507; 5,972,987; 5,977,186; 5,997,846; 5,997,847; 6,006,758; 6,053,180; 6,063,771; 6,086,682; D433,182; 6,126,681; 6,130,253; 6,139,859; 6,141,901; 6,143,020; 6,146,411; 6,146,412; 6,158,443; 6,169,850; D441,136; 6,254,337; 6,262,031; 6,265,384; 6,266,893; 6,269,549; 6,303,581; 6,342,253; 6,3424,82; 6,350,724; 6,350,734; 6,355,915; 6,357,491; 6,386,845; 6,408,533; 6,425,403; D462,141; 6,440,157; 6,440,388; 6,485,734; 6,524,604; 6,541,455; 6,541,740; 6,565,665; 6,572,333; D477,112; 6,588,140; 6,596,291; 6,607,716; 6,637,440; 6,663,860; 6,663,876; 6,678,994; 6,685,969; 6,689,079; 6,689,394; 6,691,713; D487,945; 6,701,552; 6,727,228; D490,185; 6,745,996; D493,571; 6,793,931; 6,827,729; 6,876,884; 6,936,269; 6,974,584; 7,030,095; 7,037,068; 7,040,037; 7,047,660; 7,064,108; D524,983; 7,089,945; 7,090,833; 7,178,261; 7,220,273; 7,264,004; 7,282,211; 7,294,342; 7,3579,39; 7,361,366; 7,389,779; 7,393,528; 7,412,781; 8,118,036; 5,435,327; 6,086,682; 20130284111; 20040126403; 20040126435; 20050013727; 20050051190; 20050261740; 20060130393; 20070068544; 20080214657; 20100049285; 20100049286; 20100071713; 20100145417; 20100331931; 20180255901; 20160018100; 20100145417; 20100086577; 20100049286; 20080212312; CH 272949; CH 272949; EP 2326200; ES 1094613; EP 0689783; EP 0693262; EP 1036522; WO 90/10432; WO 91/05561; WO 91/15953; WO 91/16032; WO 94/16665; WO 98/30124; WO 99/35498; WO 99/52410; WO 99/66790; WO 00/00213; WO 00/19857; WO 00/42982; WO 00/54816; WO 00/62613; WO 00/72814; WO 01/52689; WO 01/78750; WO 02/089584; WO 03/045145; WO 03/056972; WO 03/057231; WO 03/066009; WO 03/092583; WO 2005/007188; WO 2005/079563; WO 2005/107453; WO 2005/113060; WO 2006/017263; WO 2006/026806; WO 2006/071248; WO 2006/125160; WO 2006/137141; WO 2007/056813; WO 2007/104345; WO 2008/007055; WO 2008/022386; WO 2008/022387; WO 2008/038108; WO 2008/067054; WO 2008/087148; WO 2008/122837;

Hiraoka Tauyoshi et al. "Thermotolerance of human body louse *Pediculus humanus* corporis 1: Treatment of adults and eggs by hot water" Jpn. J. Sanit. Zool. 1995 pp. 77-79 vol. 46.

Kobayashi Mutsuo et al. "Thermotolerance of human body louse *Pediculus humanus* corporis 2: Preliminary evaluation of hot air for killing adults and eggs" Jpn. J. Sanit. Zool. 1995 pp. 83-86 vol. 46.

Pearlman Dale Lawrence M D A Simple Treatment for Head Lice: Dry on Suffocation-Based Pediculicide Pediatrics Sep. 3, 2004 vol. 114.

SUMMARY OF THE INVENTION

The present invention provides an ectoparasite eradicating device configured to eradicate lice and nits by conveying and directing heated air to the base of the hair shaft where lice live and lay eggs. Current methods for eradicating lice include pesticides, home remedies, and heated air treatments. The problem with the current methods is they are either dangerous, expensive, ineffective, time consuming or require the help of another person.

The system is designed to eliminate the challenges that many people encounter today when faced with a lice infestation, whether it is on someone else or them self. The device is designed with a combination of guides to direct the heated air more accurately in a forward direction, while staying parallel to the scalp during the treatment process.

The device uses a horizontal airflow guide designed at a specific height and shaped to match the curvature of the scalp to ensure that all the air being delivered is as close to the scalp as it needs to be, across the comb head of the device. Having the horizontal airflow guide that is perfectly horizontal could result in missed louse eggs on the hair shafts, which are contacted with the comb head at the outside edges where the biggest gaps will be between the guide and the scalp. To further facilitate accuracy of the heated airflow, the bottom of the combing teeth are curved to match the natural curvature of the scalp in both directions, such that the entire face of each tooth is in contact with scalp at all times. At the leading edge of the horizontal airflow guide, is a small abruption that trips a small portion of the lower part of the airflow stream, causing the air to be tripped and rolled creating a small vortex. The small vortex that is created develops a small boundary layer of air that essentially extends the boundary of the airflow guide allowing the airflow stream to extend further from the comb head before the air becomes turbulent and spreads out.

The device also embodies a swivel between the comb head and the airflow chamber that connects to the blow dryer. The airflow chamber has a bend in it such that when the treatment process is being performed and the device is being transitioned from the back of the head to the front of the head, the person performing the treatment can reach around the head without discomfort and repositioning device and oneself. Furthermore, having the ability to change the position of the blow dryer allows for a person to perform the treatment process independently on themselves.

The device provides a universal connection using a ribbed, silicon sleeved, tapered collar, adapted to interface between blow dryers having a range of diameters. The most commonly used blow dryers used are designed with nozzles of similar size allowing the device to be functional without having to acquire additional equipment. Furthermore, almost all blow dryers on the market can deliver the minimum required temperature that will eradicate lice and nits, which is of temperature that could harm the patient, so developing a way to deliver the air to the lice and nit infested area is necessary to eliminate having to acquire special types of high temperature blowers.

It is therefore an object to provide an anti-ectoparasite apparatus, comprising a conduit, having a first axis and a fixation portion for releasable attachment to a tube, and being configured to receive a flow of heated air; a rotatable sleeve joint; and a comb unit connected to the conduit via the rotatable sleeve joint, the comb unit comprising; a hollow shell configured to angularly redirect air from the first axis defined by the conduit, to a second axis angularly displaced from the first axis; at least three parallel plates configured as a comb, extending from the hollow shell, the at least three parallel plates each having a foot defining a lower concave boundary configured to contact skin and move along the skin with the hair extending from the skin into the comb, wherein the at least three parallel plates are aligned with the second axis; and a surface parallel to the second axis, displaced from the feet of the at least three parallel plates, and being configured to separate the heated air received from the conduit from the skin, having a deflector situated within a space between adjacent parallel plates, the at least three parallel plates and the surface being together configured to redirect the flow of heated air from the tube along the at least three parallel plates and the surface, and dependent on a rotational angle of the rotatable sleeve joint, and to interrupt a flow of heated air along an upper side of the surface to locally introduce vortices to heat the hair proximate to a root of the hair without burning the skin. The heating of the hair is effective to kill insects, arthropods, and their eggs, e.g., of family Pediculidae and their eggs, e.g., *Pediculus humanus*.

The fixation portion may be configured for attachment to the tube comprising a blow dryer nozzle having a diameter between 1.4" and 2.5".

The first axis and the second axis differ by between 20° and 60°, and preferably the first axis and the second axis differ by between 30° and 60°, e.g., 40°.

The at least three parallel plates may comprise at least five intervening hot air flow spaces.

The surface may define a hollow space below the surface between the at least three parallel plates.

A flow of air over the surface may be configured to induce a flow of cool air in the hollow space below the surface between the at least three parallel plates.

The fixation portion may comprise a plurality of radial inwardly extending elastomer ribs.

The feet may define an interrupted surface which is concave in two dimensions.

It is also an object to provide an anti-ectoparasite apparatus, comprising a tubular adapter configured to surround a blow dryer nozzle having a diameter of between 3 cm and 8 cm, e.g., 3.5-7.5 cm, 4-7 cm; a rotatable sleeve, attached to the tubular adapter at an angle of between 15-60 degrees; and a diffuser, linked to the rotatable sleeve, comprising: a shroud; a comb comprising at least three parallel sheets extending from the shroud, each sheet having a lower edge configured to contact skin and move along the skin with the at least three parallel sheets perpendicular to a skin surface; and a plate parallel to the skin and intersecting the at least three parallel sheets displaced from the lower edge, defining a hot air space above the plate and cool air space below the plate, the plate having a flow deflection lip configured to interrupt a laminar air flow from the blow dryer above the plate, the rotatable sleeve being configured to reposition the shroud with respect to the blow dryer to maintain the lower edges against the scalp over a range of relative angles of the shroud and the nozzle.

The apparatus may be effective to kill insects of family Pediculidae and their eggs with hot air from the blow dryer.

The rotatable sleeve may be configured to provide at an angle of 30-60 degrees between the shroud and the nozzle.

A flow of the hot air above the plate may induce a flow of cool air below the plate.

The lower edges may define a concave surface.

It is a further object to provide A method for treating an ectoparasite colonization, comprising: attaching to a nozzle of a blow dryer a fixation portion of a conduit, the conduit having a first axis and being configured to receive a flow of heated air, the conduit being interfaced with a comb unit with a rotatable sleeve joint, the comb unit comprising; a hollow shell which angularly redirects air from the blow dryer along the first axis, to a second axis angularly displaced from the first axis; at least three parallel plates configured as a comb, extending from the hollow shell, the at least three parallel plates each having a foot defining a lower concave boundary configured to contact skin and move along the skin with the hair extending from the skin into the comb, wherein the at least three parallel plates are aligned with the second axis; and a surface parallel to the second axis, displaced from the feet of the at least three parallel plates, which separates the heated air from the blow dryer from the skin, having a deflector situated within a space between adjacent parallel plates, the at least three parallel plates and the surface together redirecting the flow of heated air from the blow dryer along the at least three parallel plates and the surface, and dependent on a rotational angle of the rotatable sleeve joint, interrupting a flow of heated air along an upper side of the surface to locally introduce vortices; placing the feet against a scalp with the blow dryer blowing hot air; and displacing the feet along the scalp it heat the ectoparasites at a distance of 5 mm from the scalp to a temperature above 120° F. for at least 5 seconds, without burning the scalp.

Said displacing may comprise holding sections of hair up and combing the hair opposite to the direction of hair growth with the comb.

The method may further comprise holding the feet with the hot air blowing at the treatment site for 5 to 15 seconds.

The hair is preferably dry (and combed) prior to treatment.

The exemplary embodiment of the presently disclosed subject matter, is a device that is configured to convey heated air, at a minimum temperature of 128° F., from a common, commercially available blow dryer, suitable for humans, and a method to eradicate ectoparasites, specifically lice and lice eggs, from the hair and scalp of a human head. The focus of the disclosure is specifically on the eradication of head lice and eggs, or nits, on a human host, but it should be known that the device and methods herein are not limited to lice but can also be applied to other species of ectoparasites.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

BRIEF DESCRIPTION OF DRAWINGS

In order to better understand the subject matter that is disclosed herein and to exemplify how it may be carried out in practice, embodiments will be described, by way of non-limiting examples only, with reference to the accompanying drawings, in which.

Figure 1:
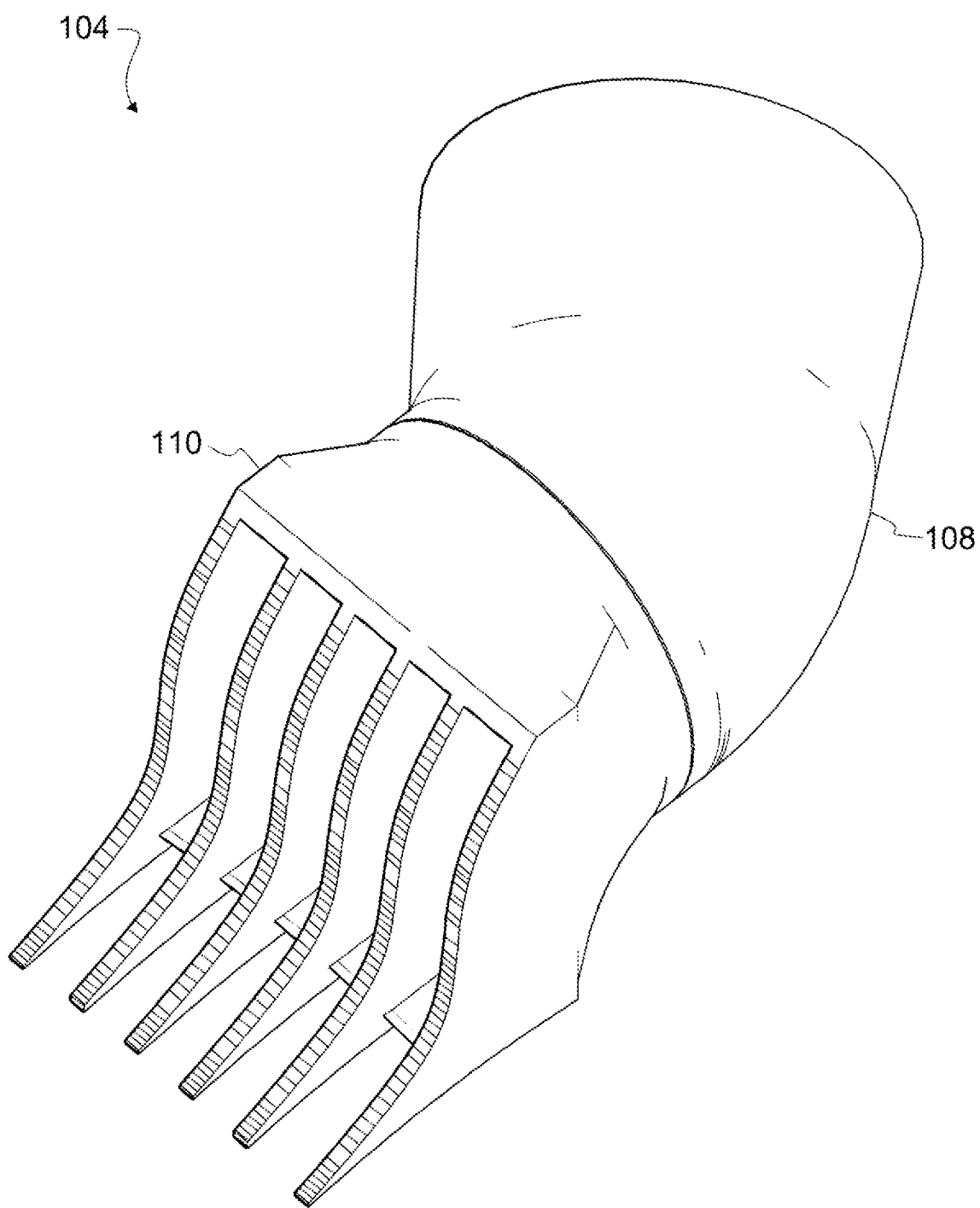
FIG. 1 is a front perspective view of the ectoparasite eradicating device.

The drawings described herein are for illustration purposes and are not intended to limit the scope of the present disclosure in any way.

DETAILED DESCRIPTION OF THE PREFERRED EMBODIMENT

A common blow dryer applies high temperature airflow streams from to the base of the hair shaft of a human scalp. In general terms a blow dryer is an electric device used to dry a person's hair by blowing warm air over the hair. Because head lice are highly susceptible to heat and do not live long when exposed to temperatures above 130° F., high temperature heat cycles from the blow dryer become a viable option in the eradication of head lice and nits.

Although blow dryers are most commonly used as a styling tool, they serve many purposes by men, women and children. Most blow dryers comprise a heating element, blower, handle, air intake and a nozzle. Regardless of the blow dryer brand, they are relatively similar in size and shape. Typically, the only major difference you will find, depending on the country you are in, is the plug. The most widely used blow dryers have nozzles diameter that ranges between 1.8" and 2.3". According to published data a typical blow dryer can blow hot air consistently in the temperature range of 80° F. and 140° F.

Because blow dryers have multiple settings to adjust the velocity and temperature of the airstream, testing of the various combinations was conducted. Knowing which combinations were best for killing lice was necessary to the design of the device. The method of testing included measuring the temperature of the heated air stream exiting the blow dryer at various temperature settings and velocities for two commonly found brands of blow dryers, Remington and MHU. A typical blow dryer has three temperature settings of cool, warm, and hot; and two speed settings of low and high. The testing procedure included measuring the heated air stream, at various combinations of each setting, using a high temperature digital thermometer, set at a specific distance from the blow dryer nozzle. The temperature needed to be measured at a set distance from the face of the blow dryer nozzle because placing the thermometer directly against the face of the nozzle would create inaccurate temperature readings. This is because the nozzle contains multiple components that block and deflect the airstream in various directions making it difficult to locate the best place for temperature measurement. To facility accurate airflow temperature readings, the air was channeled in a single direction using 4" long 3D printed cylinder. One end of the cylinder diverges to allow for connection to the tapering end of a blow dryer. The diameter of the cylinder at the diverging end is about 2.5" and the diameter of the cylinder at the opposite end is about 2". A hole was drilled at a distance of about 3" from the diverging end of the cylinder for insertion of the thermometer which provided a gap of about 1.5" between the nozzle face and the thermometer. The thermometer was placed at a location where the deflected air streams converged and in proximity of the nozzle due to how quickly the heated air cools once it exits the nozzle. Because the cylinder creates a barrier between the ambient air and heated airstream, the air can be projected further before it starts to cool. Next, the temperature of the airstream was measured and recorded at a combination of settings for each blow dryer three times and the readings averaged.

At a setting of low heat and low speed, the Remington blow dryer supplied air at an average temperature of 88° F. At the same setting, the MHU blow dryer supplied air at an average temperature of 89° F.

At a setting of low heat and high speed, the Remington blow dryer supplied air at an average temperature of 113° F. At the same setting, the MHU blow dryer supplied air at an average temperature of 114° F.

At a setting of high heat and low speed, the Remington blow dryer supplied air at an average temperature of 140° F. At the same setting, the MHU blow dryer supplied air at an average temperature of 146° F.

At a setting of high heat and high speed, the Remington blow dryer supplied air at an average temperature of 178° F. At the same setting, the MHU blow dryer supplied air at an average temperature of 201° F.

The results showed that a common blow dryer can supply air at temperatures significantly higher than 140° F. According to an article published in July 2021 by the website "Top Ten Reviews" hair dryers can reach temperatures of around 197° F. which coincides with the testing results.

The results also show that in order to effectively eradicate lice and nits, the temperature setting needs to be at the highest heat setting, but can vary due to airflow speed.

According the National institute of Standards and Technology, the human skin begins to feel pain at a temperature off 111° F. and sustain first degree burns at 118° F. when exposed for a specific period of time.

The threshold at which a human feels pain depends on a variety of factors including length of exposure, location of exposure, sex, age, health status, skin type, etc. For the human scalp, exposure times and thresholds can be significantly different depending on the amount and thickness of the hair on the head. The pain threshold of a person exposed to heated air directed at the scalp with respect to age, hair type and sex, is a key factor in the design of a device used to convey high temperature air in proximity of the scalp.

A test was conducted to determine the pain threshold when exposed to heated air directed at the scalp of five individuals.

The test consisted of using a common blow dryer (Remington) and an infrared laser thermometer. The five individuals ranged in sex and age. Individual A was a 38 year old female, individual B was a 12 year old female, individual C was a 48 year old male, individual D was a 30 year old male and individual E was a 10 year old male. The parameters of the test included directing a heated air stream, at a combination of airflow settings, to the scalp of the individuals. The following data was recorded: temperature and airflow setting, distance the blow dryer nozzle was from the scalp, the quantity of time until the individual felt pain and the temperature of the scalp at the the pain was felt.

Following are the test results for the pain threshold recorded for each individual with the blow dryer set to high heat, low airflow and the nozzle at a distance of 6" from the scalp. Individual A Results: 1 minute 42 seconds to feel pain. The air temperature averaged 140° F.

Individual B Results: 1 minute 32 seconds to feel pain. The air temperature averaged 139° F.

Individual C Results: Did not feel pain at 2 minutes. The air temperature averaged 132° F.

Individual D Results: 1 minute 24 seconds to feel pain. The air temperature averaged 136° F.

Individual E Results: 1 minute 26 seconds to feel pain. The air temperature averaged 137° F.

Following are the test results for the pain threshold recorded for each individual with the blow dryer set to high heat, high airflow and the nozzle at a distance of 6" from the scalp.

Individual A Results: 70 seconds to feel pain. The air temperature averaged 162° F.

Individual B Results: 66 seconds to feel pain. The air temperature averaged 145° F.

Individual C Results: 90 seconds to feel pain. The air temperature averaged 149° F.

Individual D Results: 65 seconds to feel pain. The air temperature averaged 153° F.

Individual E Results: 50 seconds to feel pain. The air temperature averaged 145° F.

Following are the test results for the pain threshold recorded for each individual with the blow dryer set to high heat, low airflow and the nozzle at a distance of 3" from the scalp.

Individual A Results: 25 seconds to feel pain. The air temperature averaged 143° F.

Individual B Results: 66 seconds to feel pain. The air temperature averaged 133° F.

Individual C Results: 35 seconds to feel pain. The air temperature averaged 132° F.

Individual D Results: 72 seconds to feel pain. The air temperature averaged 139° F.

Individual E Results: 52 seconds to feel pain. The air temperature averaged 131° F.

Following are the test results for the pain threshold recorded for each individual with the blow dryer set to high heat, high airflow and the nozzle at a distance of 3" from the scalp.

Individual A Results: 3 seconds to feel pain. The air temperature averaged 173° F.

Individual G Results: 3 seconds to feel pain. The air temperature averaged 158° F.

Individual C Results: 8 seconds to feel pain. The air temperature averaged 152° F.

Individual D Results: 5 seconds to feel pain. The air temperature averaged 166° F.

Individual E Results: 3 seconds to feel pain. The air temperature averaged 156° F.

The results show that regardless of the age and sex of the person tested, the pain threshold fell within a certain temperature range. A heated airstream, at low velocity, directed at the scalp fell within the range of 126° F.-144° F. at a distance of 3" and 6". When the velocity of the air increased (while maintain the same temperature setting) the pain threshold fell within the range of 145° F.-173° F. This information is significant to the invention because it defines the safety parameters of the invention.

The ectoparasite eradicating device, when affixed to a blow dryer, will direct the heated air parallel to the scalp to where lice live and lay eggs. To ensure the heated air is being properly directed to the target area, the device uses horizontal and vertical airflow guides to channel and direct the airflow. The device is cylindrical shaped with combing teeth to separate and lift the hair during treatment. The horizontal guide is also used to keep the heated air stream off the scalp. The material of the device is of a material of low thermal conductance that can withstand temperatures above 400° F. for long periods of time without the structure being negatively impacted. The material used allows for the internal surface of the device to be smooth to induce laminar flow and reduce static pressure.

The opening of the comb where the heated air exits out of is sized to be of an area similar to the that of a blow dryer nozzle. If the opening of the device head is too small, static pressure can increase putting an extraneous load on the motor of the blow dryer potentially causing damage to it. In one embodiment a low voltage temperature sensor is used to alert the user that the temperature of the scalp is approaching a specified threshold temperature. For example, the top of the comb head comprises a detachable compartment that contains a battery, speaker and circuitry to convert the signal from the temperature sensor to an audio or visual alert mounted to the top of the compartment. The temperature sensor is placed at the underside of the horizontal airflow guide that enunciates an alarm when the temperature of the scalp rises above a specified temperature. Other sensors may include sensors at the base of the teeth that alarm when the combing teeth lose contact with the scalp indicating that the device may be tipped to far forward potentially burning the scalp of the actor.

Optionally, ultraviolet (UV) illuminators are provided to illuminate the tips of the combing teeth to illuminate the lice or make them glow. Because the UV is not as effective in spotting nits, special shampoos or dye can be used to coat the nits causing them to glow.

In another embodiment, small LED illuminators are provided at the base of the comb, directed at the scalp in front of the comb to improve the detection of the tiny nits at the base of the hair shafts.

Another embodiment includes a "bumper" in front of the comb that comprises vertical guides that detangle, separate and raise the hair prior contact with the comb head, allowing the heated air to flow between the strands of hair more easily.

In another form, the device can be used on animals to eradicate flees, ticks or other parasites that are highly susceptible to hot air. The comb used on a pet would be smaller than that used for a human scalp, allowing the device head to be more easily guided around the animal's extremities. The teeth of the comb may be more rounded and tighter together to separate and lift and animals course fur or hair and overcome the animal's loose skin.

The following discussion provides a general overview of the exemplary embodiments of the presently disclosed subject matter. Subsequent to the general overview will be a more detailed discussion of the exemplary embodiments and methods represented in the figures of the present invention.

Figure 3:
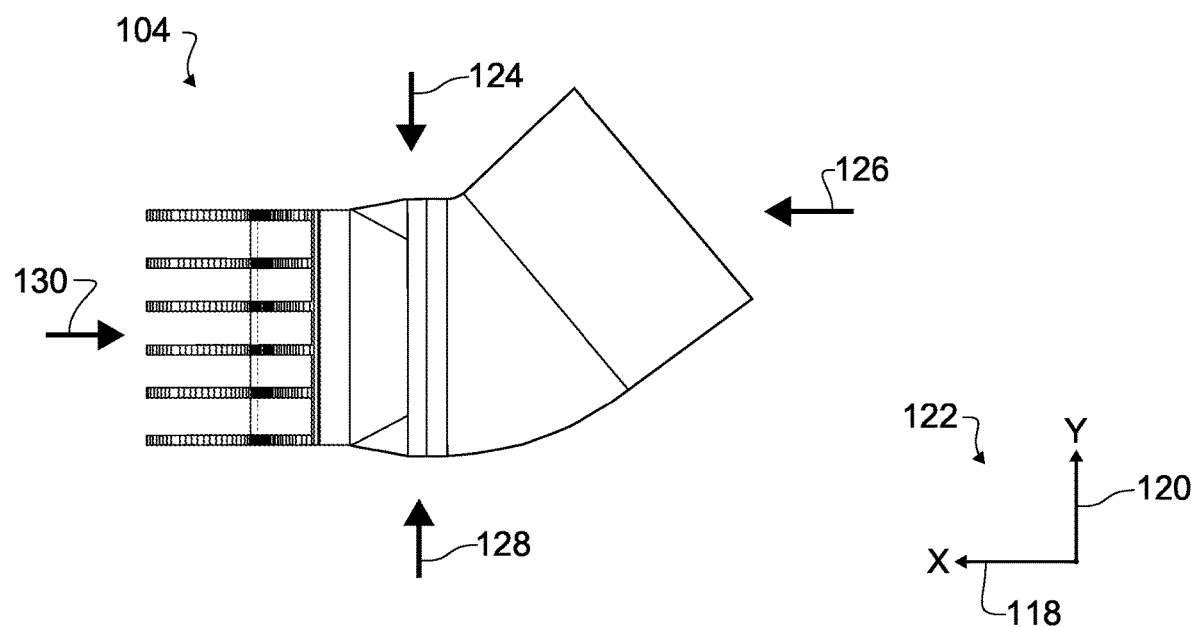
FIG. 3 is a top view of the ectoparasite eradicating device shown in FIG. 1 with a coordinate plane showing how the device and various elements of the device will be referenced throughout the disclosure.

The following terms shall be interchangeable, "parasite eradicating device" and "device". FIG. 3 shows a top view of the device 104, with arrows that represent the direction at which the embodiment is being viewed. The front view is represented by arrow 130. The left view is represented by arrow 128. The right view is represented by arrow 124 and the back view is represented by arrow 126. FIG. 3 also shows the x-y coordinate plane, which will be used when describing a direction relative to a top view of an embodiment. The positive direction of the x-axis or forward direction, in the coordinate plane depicted, is represented by reference number 118. The positive direction of the y-axis or horizontal direction, in the coordinate plane depicted, is represented by reference number 120.

For the following general description of the ectoparasite eradicating device, reference FIGS. 1-6. FIG. 1 is a front perspective view of the ectoparasite eradicating device 104 according to one embodiment of the presently disclosed subject matter. The illustration shows two, separate unitary parts of the device, the comb head 110 and the airflow chamber 108. The comb head 110 comprises a set of combing teeth 76 used to guide the airflow in the horizontal direction 120, while also separating the hair and exposing the lice and eggs to the heated air delivered by the device. The airflow in the horizontal direction is limited by the outer combing teeth 76a and 76f, as shown in FIG. 5A.

Figure 4:
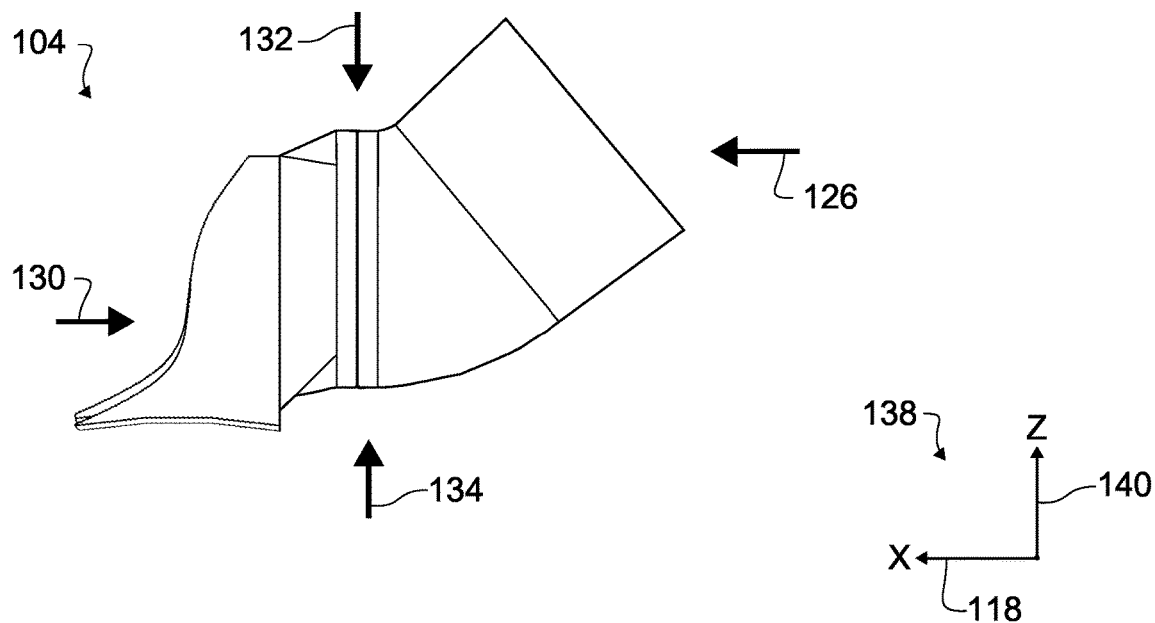
FIG. 4 is a right-side view of the ectoparasite eradicating device shown in FIG. 1 with a coordinate plane showing how the device and various elements of the device will be referenced throughout the disclosure.

FIG. 4 shows an elevation view of the device 104, with arrows that represent the direction at which the embodiment is being viewed. The front view is represented by arrow 130. The bottom view is represented by arrow 134. The back view is represented by arrow 126 and the top view is represented by arrow 132. FIG. 4 also shows the x-z coordinate plane, which will be used when describing an embodiment from an elevation view. The positive direction of the x-axis or forward direction, in the coordinate plane depicted, is represented by reference number 118. The positive direction of the z-axis or vertical direction, in the coordinate plane depicted, is represented by reference number 140.

The comb head 110 also comprises a horizontal airflow guide 74 that guides the heated air in the vertical direction 140, at a given elevation above the scalp, to the targeted lice infested area. The airflow is limited in the vertical direction by the comb head cap 78 as shown the sectional elevation view of FIG. 6. The airflow chamber 108 comprises a universal collar 94 that is used to affix the device to the blow dryer. The airflow chamber 108 channels the heated air from the blow dryer, through the comb head 110, to roots of the hair. The comb head 110 and the airflow chamber 108 couple by means of a female interface ring 70 and a male interface ring 82 in a way that enables one part to rotate about the x-axis 118, without rotation of the other part (also known as swiveling). The shape and size of the comb head 110 and airflow chamber 108 are not limited to the shape and size depicted in the embodiments described herein. The method of interface between the comb head 110 and the airflow chamber 108 is not limited to the shape, form, size and interface method described herein.

Figure 2:
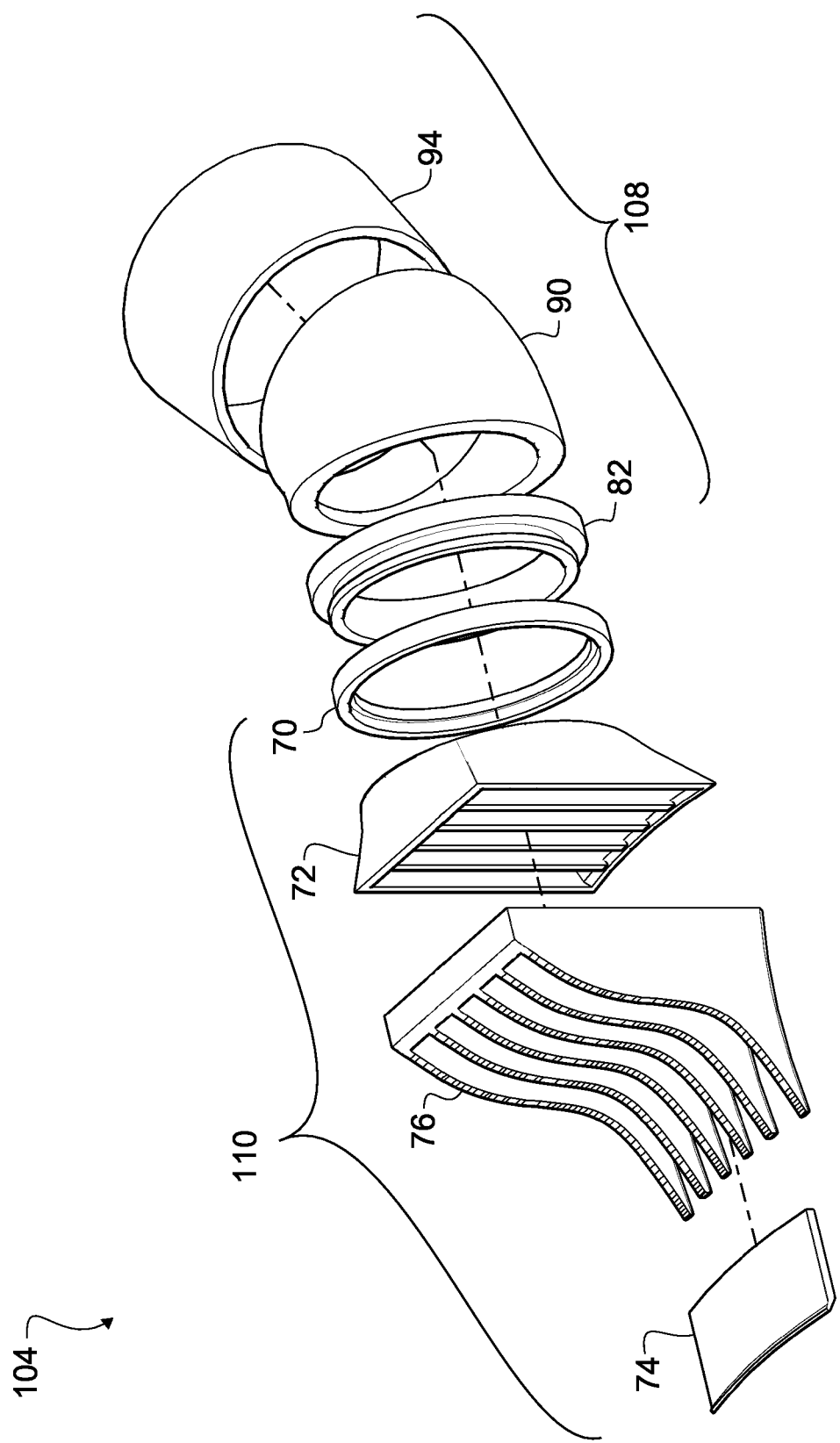
FIG. 2 is an exploded front perspective view of the hot air conveyance comb device showing the various elements that form the ectoparasite eradicating device shown in FIG. 1.

Following is a more detailed description of the figures that depict various elements of the ectoparasite eradicating device 104 of the presently disclosed subject matter. FIG. 2 represents an exploded, front prospective view of the ectoparasite eradicating device 104. The comb head 110 comprises a set of combing teeth 76, a comb head cap 78, a horizontal airflow guide 74, a square to round transition 72 and the female interface ring 70. The airflow chamber 108 comprises a male interface ring 82, an airflow chamber elbow 90 and a universal collar 94. Although the comb head 110 and the airflow chamber 108 are separate unitary parts, in FIG. 2, the components of the comb head 110 and airflow chamber 108 have been exploded to provide a better understanding of the geometry of each element and how they interface to create a unitary part.

Figure 5A:
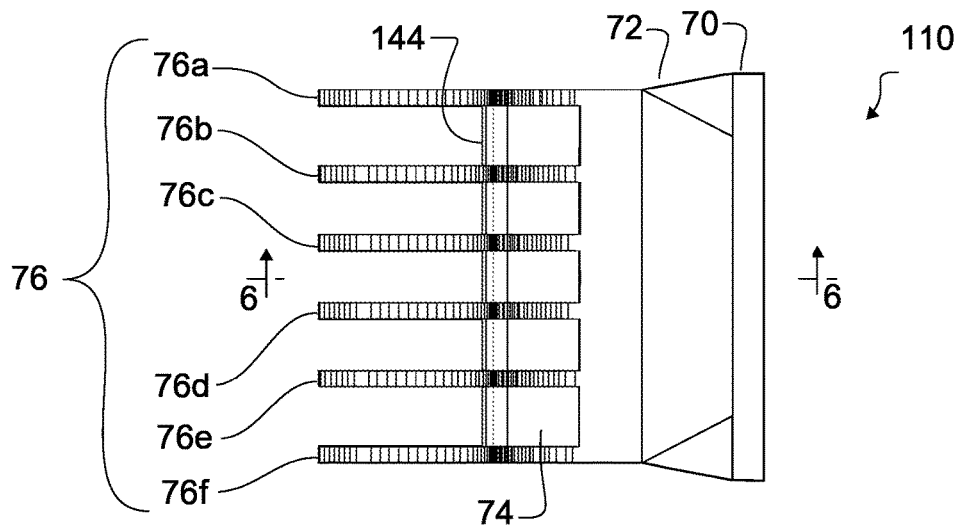
FIG. 5A is an enlarged top view of the unitized comb head.
Figure 16:
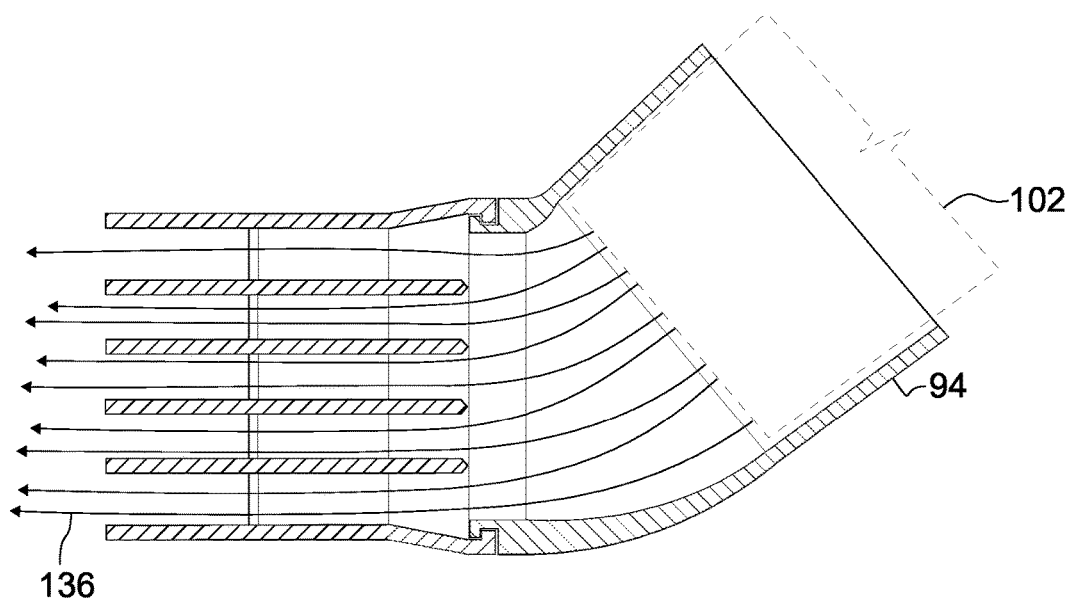
FIG. 16 is a top cross-sectional view of the ectoparasite eradicating device showing the airflow path from the blow dryer to the scalp of the actor.
Figure 17:
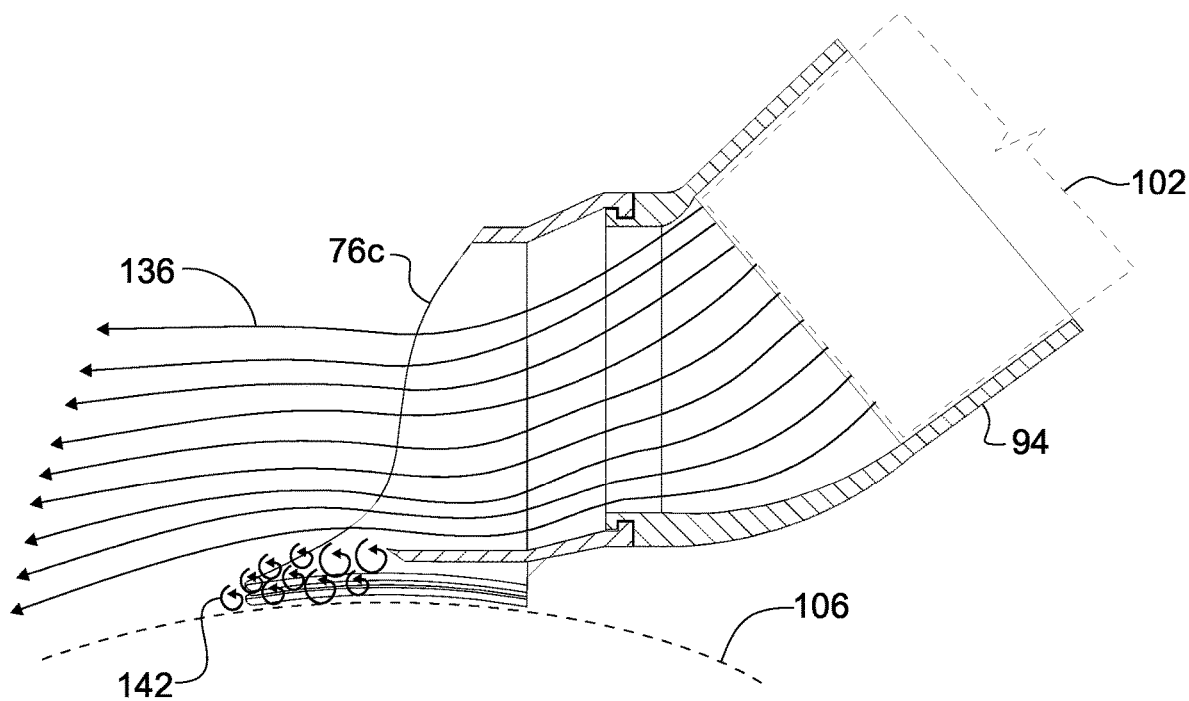
FIG. 17 is a cross-sectional, elevation view of the ectoparasite eradicating device showing the airflow path from the hot air heating element to the scalp of the actor.

Following is a detailed description of the comb head 110 in the exemplary embodiment of the presently disclosed subject matter. FIGS. 5-8 show how the elements of the comb head 110 interface to form a unitary part. As shown in FIGS. 1, 2, and 5 the comb head 110 comprises six combing teeth 76a-76f. The combing teeth 76a-76f are evenly spanned across the front of the comb head 110 in the horizontal direction. As shown in FIG. 5A combing teeth 76a and 76f create the outer boundaries of the comb head 110. As shown in FIGS. 16 and 17, one purpose of the combing teeth 76a-76f is to channel the air flow stream 136, from the blow dryer 102, and direct it toward the targeted lice and egg infested area of the hair shafts. The set of combing teeth 76 are of a thickness that will allow the teeth to maintain rigidity and not bend or flex when the comb head 110 is guided along the surface of the scalp 106, through all types of hair including, but is not limited to curly hair, coarse hair, tangled hair and long hair.

The set of combing teeth 76 are of a thickness and material that will allow for the combing teeth 76a-76f to maintain rigidity while exposed to temperatures above 128° F. for any given timeframe as the device, in one embodiment, could be used more than once, on multiple human heads, in a single setting. The quantity of combing teeth is not limited to six. The comb head 110 should comprise a minimum of two combing teeth. The quantity of combing teeth should not be of an about that negatively impacts the method of treatment described in the present disclosure. The overall shape and size of the comb head 110 is not limited to a specific size, shape or length. The set of combing teeth could be of different lengths or all the same length by really long or short, but should be of a size and shape that does not negatively impact the performance of the device during treatment.

The geometry of each combing tooth 76a-76f will be described using FIGS. 5-8. FIG. 5A is an elevational section view of the comb head 110. The combing teeth 76a-76f are shaped similarly to a right triangle. The bottom side of the triangular shaped combing teeth 76a-76f, which come into contact with the scalp 106 during treatment, is concaved to match the natural curvature of the human head. The front side of the combing teeth 76a-76f, is shaped similarly to the letter "S". The back side of the combing teeth 76a-76f is in the shape of a vertical line. As shown in FIG. 6, the point where the bottom side and front side of the combing tooth converge is rounded. The point where the back side and bottom side of the combing tooth converge is of an angle slightly less than 90°. The backside and the front side of the combing tooth do not converge, but are intersected by the comb head cap 78, creating a flat surface at the top of the combing tooth. As shown in the backside elevation view of the comb head 110 in FIG. 8, the bottom of the combing tooth is chamfered 116.

Although the combing teeth 76a-76f are being described singularly, the shape described is not limited to a single combing tooth but applies to all of the combing teeth 76a-76f in the embodiment of the presently disclosed subject matter. The geometry of the combing teeth 76a-76f is not limited to shape described herein. For example, the overall shape of the combing teeth 76a-76f can be, but is not limited to, elliptical, square, circular, hexagonal or in the shape of a trapezoid. Furthermore, the bottom side of the combing teeth 76a-76f can be, but is not limited to, rounded, square or comprise two or more shapes; the points at where the various sides of the combing tooth converge can be, but is not limited to, triangular or beveled; the side of the combing teeth 76a-76f that comes into contact with the scalp 106 can be, but is not limited to, flat, curving outward (convex) or wavy; the height and thickness of the combing teeth, 76a-76f can be of various heights and thicknesses.

Figure 6:
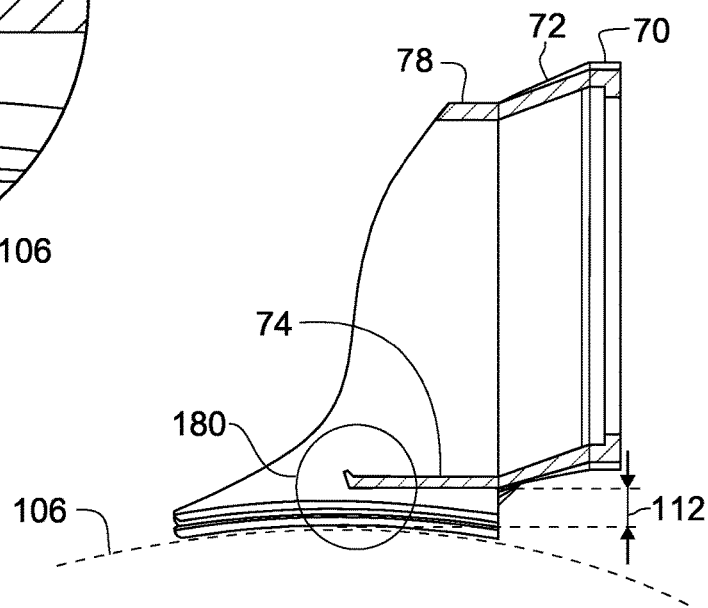
FIG. 6 is an elevational, cross-sectional view of the unitized comb head shown in FIG. 5A.
Figure 7:
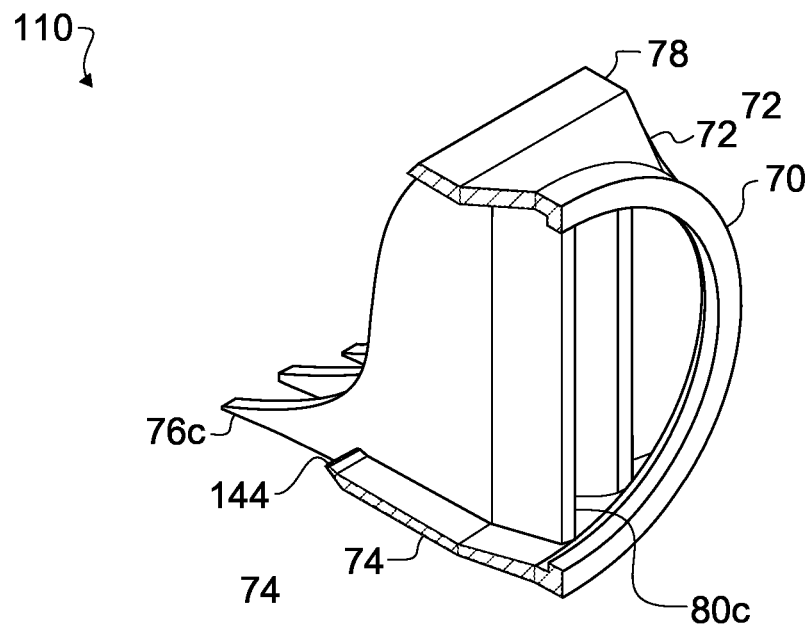
FIG. 7 is a top prospective, sectional view of the unitized comb head shown in FIG.

Following is a detailed description of the horizontal airflow guide 74 in the exemplary embodiment of the presently disclosed subject matter. FIGS. 2-8 and 17 shall be referenced as the horizontal airflow guide 74 is described. The purpose of the horizontal airflow guide 74 is to direct the heated airflow stream 136, exiting the comb head 110, in a lateral direction that is parallel to the scalp 106, at the targeted lice and nit infested area of the hair shafts. As shown in FIGS. 2, 5 and 7, the horizontal airflow guide 74 spans across the entire width of the comb head 110 intersecting combing teeth 76b-76e. The backside of the airflow guide 74 is flush with the back side of the combing teeth 76a-76f as shown in the perspective back sectional view of the comb head 110 in FIG. 7.

As shown in the sectional view of FIG. 6, the horizontal airflow guide 74 is at a height 112 above the apex of the concaved combing teeth 76a-76f. The horizontal airflow guide 74 is of a height 112 such that when pressure is placed on the scalp 106, by the comb head 110 during treatment, the bottom side of the horizontal airflow guide 74 remains at a minimum distance of 1/16" off the surface of the scalp 106. Furthermore, the gap that is created between the bottom of the horizontal airflow guide 74 and the surface of the scalp 106, allows for the treated hair to pass under the comb head 110 while the ectoparasite eradicating device 104 is being used during the treatment process. The thickness of the airflow guide 74 is of a thickness that will allow the horizontal airflow guide 74 to maintain rigidity and not bend or flex when the comb head 110 is guided along the surface of the scalp 106, through all types of hair including, but not limited to curly hair, coarse hair, tangled hair and long hair. The horizontal airflow guide 74 is of a thickness that will allow for the horizontal airflow guide 74 to maintain rigidity while exposed to temperatures above 128° F. for any given timeframe as the device, in one embodiment, could be used for more than one treatment, on multiple human heads, in a single setting. The width of the horizontal airflow guide 74, in the direction of the x-axis 118, is of a width that will guide the heated air laterally as it exits the comb head 110. If the horizontal airflow guide 74 is not wide enough, in direction of the x-axis 118, the heated air exiting the comb head 110 could contact the scalp 106 and potentially cause burns or discomfort to the actor. If the horizontal airflow guide 74 is too wide, in the direction of the x-axis 118, the set of comb teeth 76 will not be able to properly separate the hair during treatment. In the embodiment of the presently disclosed subject matter, there is a single horizontal airflow guide 74, however additional horizontal airflow guides 74 can be used so long as the performance of the device 104 is not negatively impacted, and treatment can be performed to the extent required to eradicate the lice and lice eggs.

As shown in FIG. 2, the horizontal airflow guide 74, is slightly concave to match the natural curvature of the human scalp 106. The purpose of the concaved horizontal airflow guide 74 is so that heated air exiting the comb head 110 is projected laterally and parallel to the scalp 106.

Figure 5B:
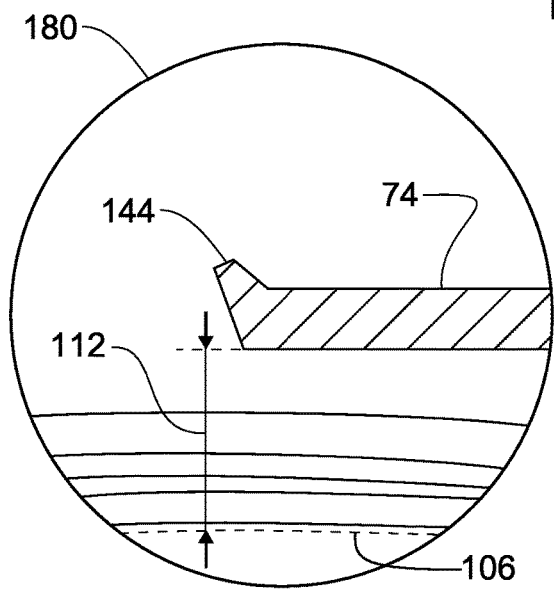
FIG. 5B is a detail view of FIG. 5A.

As shown in FIG. 5B the front, top edge of the horizontal airflow guide 74 projects slightly upward in the vertical direction forming a ridge 144 along the front edge as shown. The bottom front edge of the horizontal airflow guide 74 is beveled as shown in FIGS. 6 and 7. The purpose of the ridge 144 is to abrupt the airflow steam 136, and cause the airflow to separate. While most of the air exiting the comb head 110 will continue laterally, along the x-axis 118, the air that exits over the ridge 144 of the horizontal airflow guide 74 will separate and deflect some of the air slightly upward and some of the air downward. The airflow stream 136 being defected in the upward direction, will create a slight curvature in the airflow stream 136. The air that is not deflected upward will pass over the ridge 144 and drop creating a small vortex 142, or back flow, at the front of the horizontal airflow guide 74, as shown in FIG. 17. A vortex is naturally created when laminar airflow is abrupted when it passes over a projection protruding into the airflow. The size of the vortex is dependent on the velocity of the airflow, the size and shape of the projection and pressure difference. The small vortex 142 that is created after the air passes over the ridge 144 of the horizontal airflow guide 74 helps to further induce curvature of the airflow that is deflected in the upward. Curvature of the airflow stream 136 better matches the curvature of the scalp allowing the heated air to be directed more accurately to the targeted infested area of the hair shafts.

Following is a detailed description of the vertical airflow guides 80a-80d in the exemplary embodiment of the presently disclosed subject matter. FIGS. 2, 6-8, 14, 16 and 17 demonstrate the vertical airflow guides 80a-80d. The vertical airflow guides 80a-80d are an extension of the combing teeth 76b-76e as shown in the perspective back sectional view of the ectoparasite eradiating device in FIG. 14. The purpose of the vertical airflow guides 80a-80f is to induce laminar flow as the heated air exits the comb head 110 as shown in FIG. 16. The thickness of the vertical airflow guides 80a-80d is of the same thickness of the combing teeth 76a-76f and extend through the square to round transition 72 to be flush with the back side of the square to round transition 72 as shown in FIGS. 6, 7, 14, 16 and 17. The back face of the vertical airflow guides 80a-80d are chamfered to maintain laminar airflow and not create an abruption in the airflow as that would create turbulent airflow which is more difficult to direct to a targeted area. The back side of the vertical airflow guides 80a-80d are not limited to a chamfer. They can be of any shape so long as the performance of the device 104 is not negatively impacted, and treatment can be performed to the extent required to eradicate the lice and lice eggs.

Figure 8:
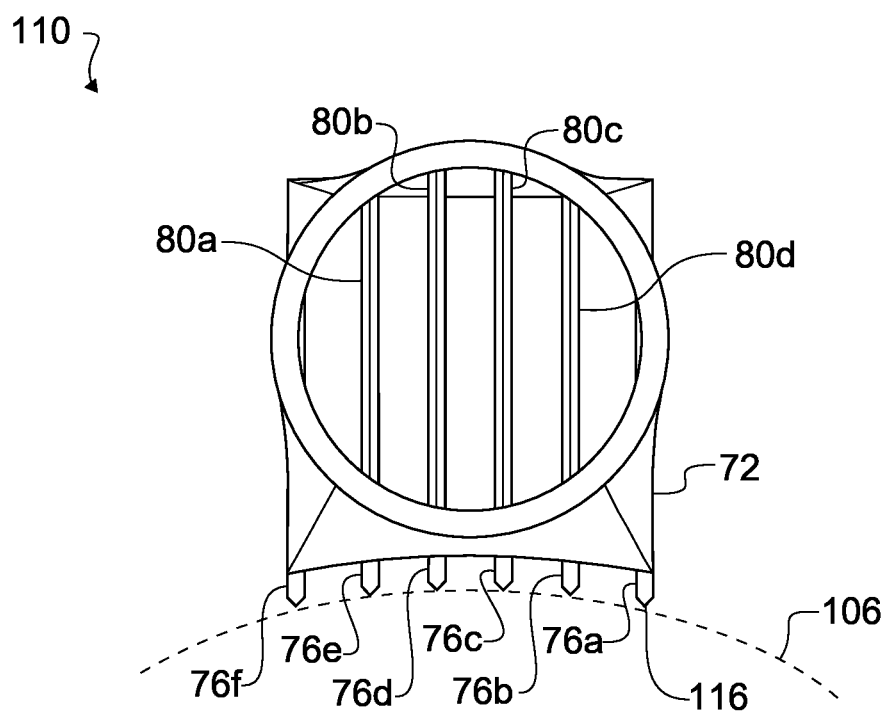
FIG. 8 is a backside view of the unitized comb head shown in FIG. 5A.

As shown in FIGS. 8 and 16, combing tooth 76a and vertical airflow guide 80d are a unitary element; combing tooth 76c and vertical airflow guide 80c are a unitary element; combing tooth 76d and vertical airflow guide 80b are a unitary element; and combing tooth 76e and vertical airflow guide 80a are a unitary element. The top and bottom shape of the vertical airflow guides 80a-80d is defined by the shape of the square to round transition as the vertical airflow guides extend from the bottom interior surface to the top interior surface of the square to round transition. In one example of an embodiment if the square to round transition changed in shape to be a round transition, because the comb head was cylindrical, the top and bottom shape of the vertical airflow guides would be of a shape that matches the new shape of the transition. The vertical airflow guides are not limited to the quantity of combing teeth. Additional airflow guides can be added or removed so long as the performance of the device 104 is not negatively impacted, and treatment can be performed to the extent required to eradicate the lice and lice eggs.

Following is a detailed description of the square to round transition 72 in the exemplary embodiment of the presently disclosed subject matter. FIGS. 2, 5-8, 14, 16 and 17 shall be referenced as the square to round transition 72 is described. The purpose of the square to round transition 72 is to transition from the cylindrical shaped airflow chamber 108 to the rectangular, back face of the set of combing teeth 76 comprising the comb head cap 78 and the horizontal airflow guide 74. As shown in FIG. 6, the bottom, front face of the square to round transition 72 aligns with the back face of the horizontal airflow guide 74. The top front face of the square to round transition 72 aligns with the back face of the comb head cap 78, also shown in FIG. 6. The front faces of the left and right sides of the square to round transition 72 align with the two outer, left and right combing teeth, 76a and 76f as shown in FIG. 5A.

As shown in FIG. 6, the square to round transition 72 slopes upward, increasing the distance between the bottom face of the square to round and the human scalp 106. Because the square to round transition slopes upward, the top face of the square to round transition is above the top of the set of combing teeth 76. The purpose of sloping the transition in the upward direction is so that the airflow chamber 108 and connected blow dryer 102 can swivel freely about the comb head 110 as the device 104 is guided around the head during the treatment process. If the square to round transition 72 extends laterally or downward, full contact between the human scalp 106 and the bottom of the set of comb teeth 76 could be hindered as the device would have to be tilted to swivel the airflow chamber 108 and connected blow dryer 102 without the handle of the blow dryer 102 coming into contact with the actor. If the device 104 is tipped toward the human scalp 106 to swivel the blow dryer 102, during the treatment process, the actor could sustain burns or other injuries to the scalp 106. Increasing the overall width of the square to round transition 72 (increasing the size in the direction of the x-axis), will increase the distance between the handle of the blow dryer 102 and the actor as airflow chamber 108 and the blow dryer 102 swivel about the comb head 110 during the treatment process. If the width of the square to round transition is to long, the actor will have a difficult time performing the treatment process alone. The width of the square to round transition 72 should be of a length that does not negatively impact the performance of the device 104 allowing the treatment to be performed to the extent required to eradicate the lice and lice eggs. The overall size and shape of the square to round transition 72 should be of a shape and size that provides a smooth transition between the airflow chamber 108 and comb head 110 to maintain laminar flow as the air exits the device 104.

In one embodiment of the parasite eradicating device 104, the combing teeth 76a-76f comprising of the airflow guide 74 and the comb head cap 78 could be of a cylindrical shape similar in size to the cylindrical airflow chamber 108 making a transition of any sort unnecessary between the comb head 110 and the airflow chamber 108. A transition is only necessary if the two parts being interfaced are of different sizes or shapes.

Following is a detailed description of the female interface ring 70 and the male interface ring 82 in the exemplary embodiment of the presently disclosed subject matter. FIGS. 2, 6-9, 12-15 shall be referenced as the female interface ring 70 is described. The female interface ring 70 is an element of the unitized comb head 110. The male interface ring 82 is an element of the unitized airflow chamber 108. The female interface ring 70 interfaces with the male interface ring 82 of the airflow chamber. The interface of the two elements is not a fixed interface, but a swiveling connection as shown by the arrows 98 and 100 in FIG. 15. The arrows 98 and 100 represent that there is rotation in either direction at the connection point between the comb head 110 and the airflow chamber 108. More specifically, comb head 110 can swivel freely about the airflow chamber 108, about the x-axis 118, which is represented by arrow 98. The airflow chamber 108 can swivel freely about the comb head 110, about the x-axis 118, which is represented by arrow 100.

Figure 12:
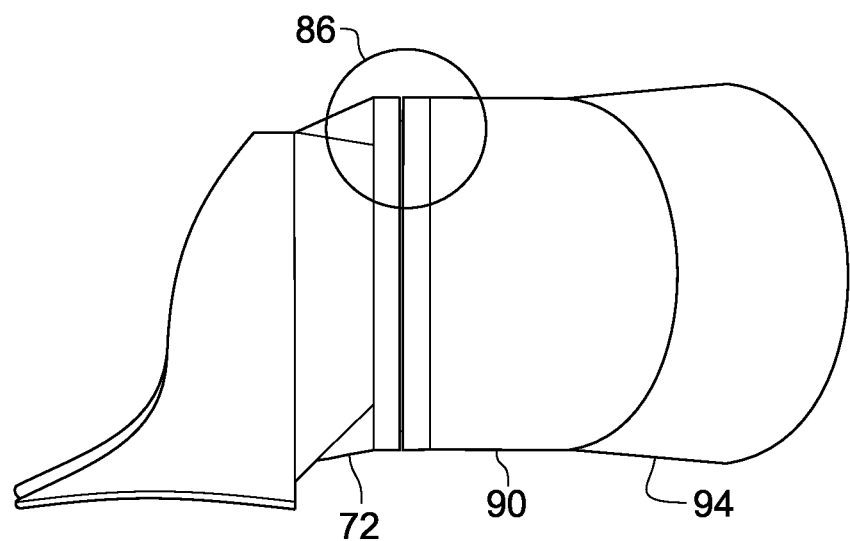
FIG. 12 is a right-side view of the ectoparasite eradicating device shown in FIG. 1.

FIG. 12 is a right side elevation view of the ectoparasite eradicating device 104.

Figure 13:
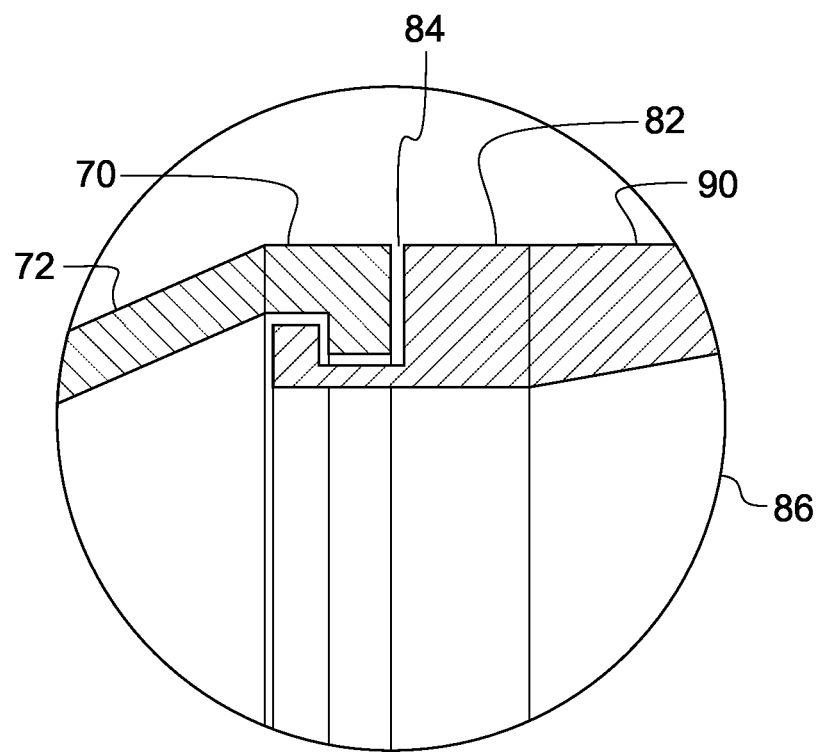
FIG. 13 is an enlarged, cross sectional view of the female and male interface rings shown in FIG. 12.

FIG. 13 shows a blown up, partial elevational section view of the connection point between the female interface ring 70 and the male interface ring 82. The female interface ring 70 is shown to have a small flange that protrudes inward, toward the center of the ring. The male interface ring 82 is shown to have a small flange that protrudes outward, away from the center of the ring. When the two rings are combined, this is the mechanism that holds the comb head 110 and the airflow chamber 108 together as shown in FIG.

13. The flanges on both the female interface ring 70 and the male interface ring 82 are sized so that when combined, a uniform gap 84 is created between the interfacing elements of the flanges. The uniform gap 84 that is created shall be large enough to allow the comb head 110 and the airflow chamber 108 to swivel about each other freely, yet small enough to keep the two parts from coming apart as shown in FIG. 13. When combined, the outside diameters of the female interface ring 70 and the male interface ring 82 should be of similar size to allow for a smooth transition between the swiveling parts. The front face of the female interface ring 70 aligns flush against the back side (cylindrical side) of the square to round transition 72 as shown in FIGS. 5-7, 12, 12-17. The two mating faces of the female interface ring 70 and the square to round transition 72 have the same wall thickness for a smooth transition between the two elements as shown in FIG. 13. The back face of the male interface ring 82 aligns flush against the front face of the elbow 90 of the airflow chamber 108 as shown in FIGS. 2, 9 and 12-14. The two mating faces of the male interface ring 82 and the airflow chamber elbow 90 have the same wall thickness for a smooth transition between the two elements as shown in FIG. 13.

Figure 15:
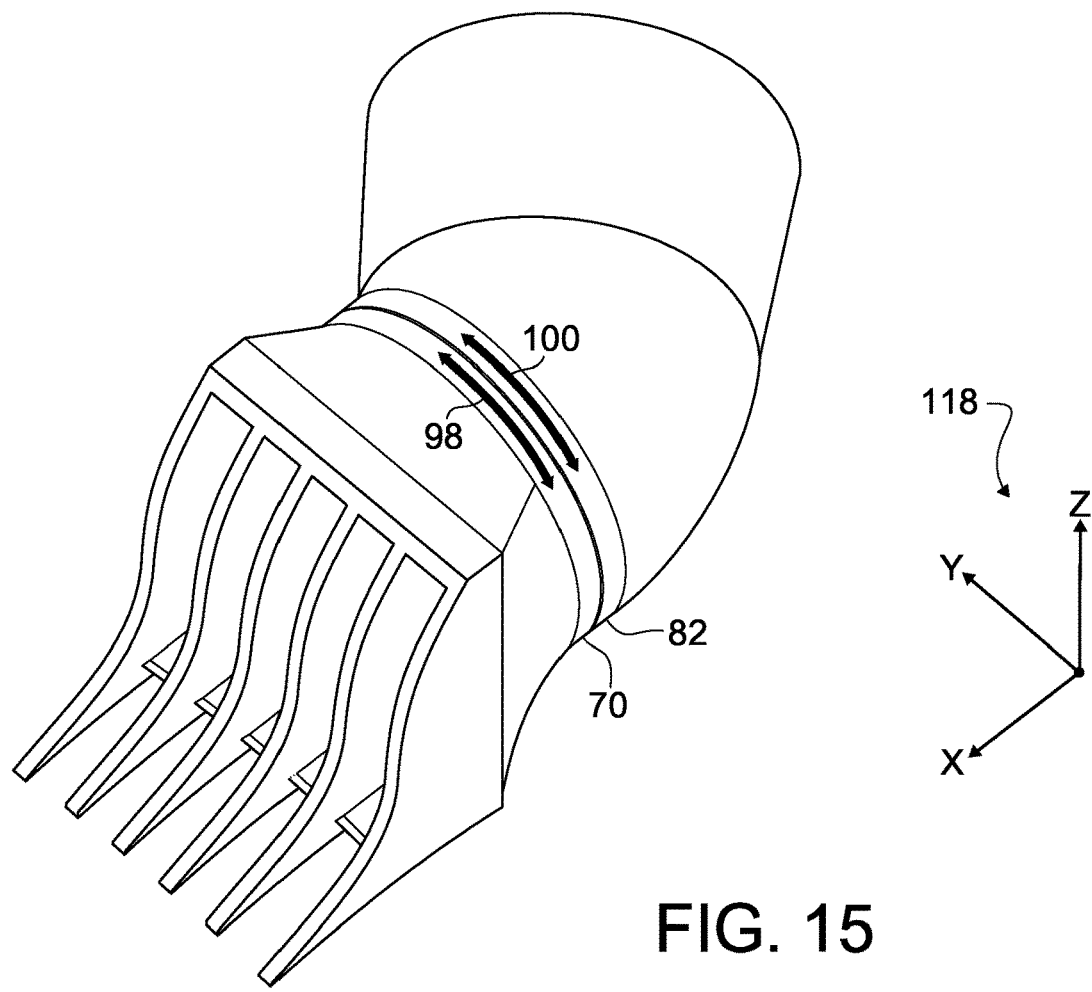
FIG. 15 is a top prospective view of the unitized hot air conveyance comb showing rotation between the unitized comb head and unitized airflow chamber, oriented so that the distal face of the combing teeth can be seen.

As described above, the interface of the two elements is not a fixed interface, but a swiveling connection as shown by the arrows 98 and 100 in FIG. 15. The flanges of the mating rings can be of various shapes and sizes to allow for a smoother transition between the elements. The outer diameters of the female interface ring 70 and the male interface ring 82 do not have to be of the same diameter or shape. The outer surface can have grooves or bumps. The internal surface of the interfacing rings 70 and 80 when combined should not create a surface where the performance of the device 104 is not negatively impacted, and treatment can be performed to the extent required to eradicate the lice and lice eggs.

Figure 9:
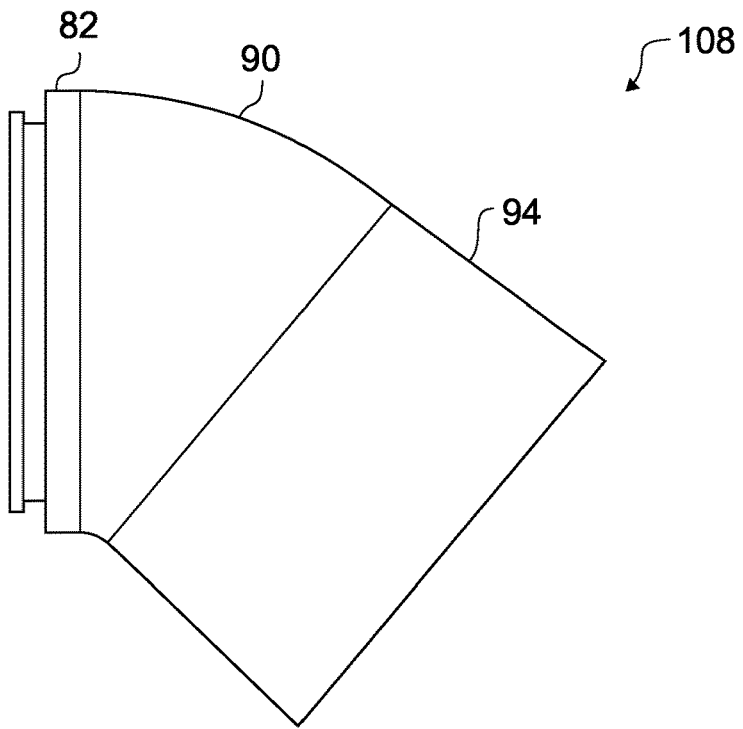
FIG. 9 is top view of the unitized airflow chamber.
Figure 10:
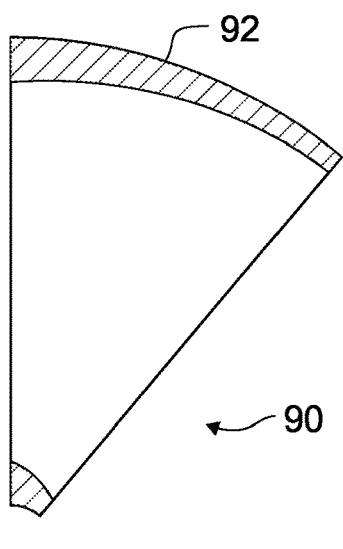
FIG. 10 is a cross-sectional view of the hot air conveyance comb elbow shown in FIG. 9.

Between the universal collar 94 and the male interface ring 70 is the airflow chamber elbow 90 as shown in FIGS. 2, 9, 10. The airflow chamber elbow is of a radius that allows the blow dryer 102, when affixed to the device 104, to rotate about the comb head 110 to a variety of positions that improve contact between the set of combing teeth 76 and the scalp 106. The elbow 90 is of a diameter that allows the back face of the elbow to be flush to the front face of the universal collar 94 and the front face of the elbow to mate flush against the male interface ring 82. The wall thickness is of a thickness that is of the same thickness as the surrounding elements.

Figure 14:
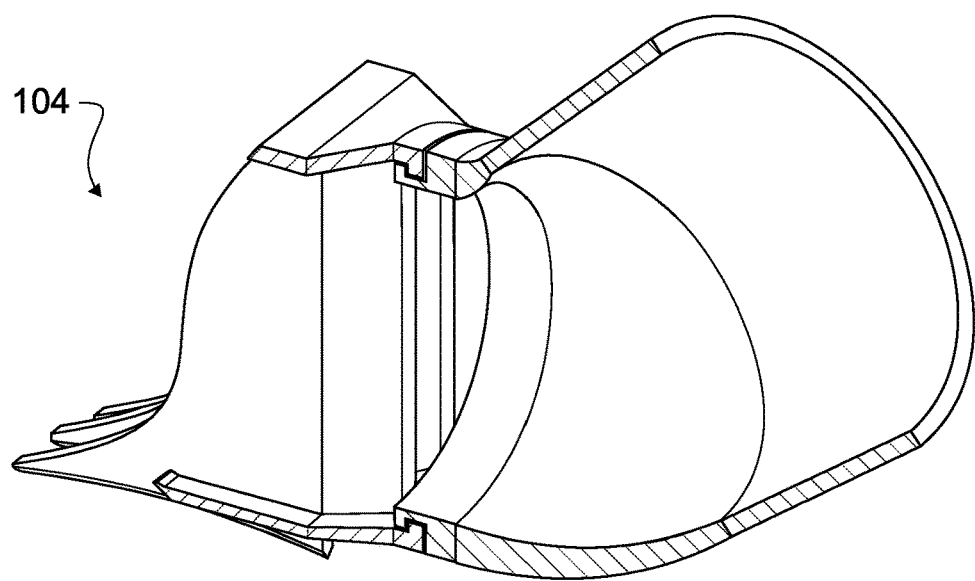
FIG. 14 is a top prospective, cross sectional view of the ectoparasite eradicating device shown in FIG. 1.

As shown in FIGS. 10 and 14, the wall thickness of the male interface ring 82 and the wall thickness of the tapered end of the universal collar 94 are of different thicknesses. In FIG. 14 it can be seen that the thickness of the elbow 90 wall gradually changes in size to meet the wall thickness of the surrounding elements to allow for smooth internal surface of the device 104. The radius of the elbow 90 can be of any radius as long as the performance of the device 104 is not negatively impacted, and treatment can be performed to the extent required to eradicate the lice and lice eggs.

Figure 11:
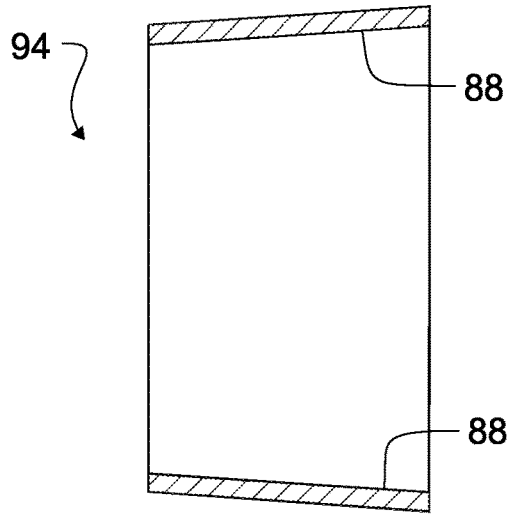
FIG. 11 is a cross-sectional view of the universal collar shown in FIG. 9.
Figure 19:
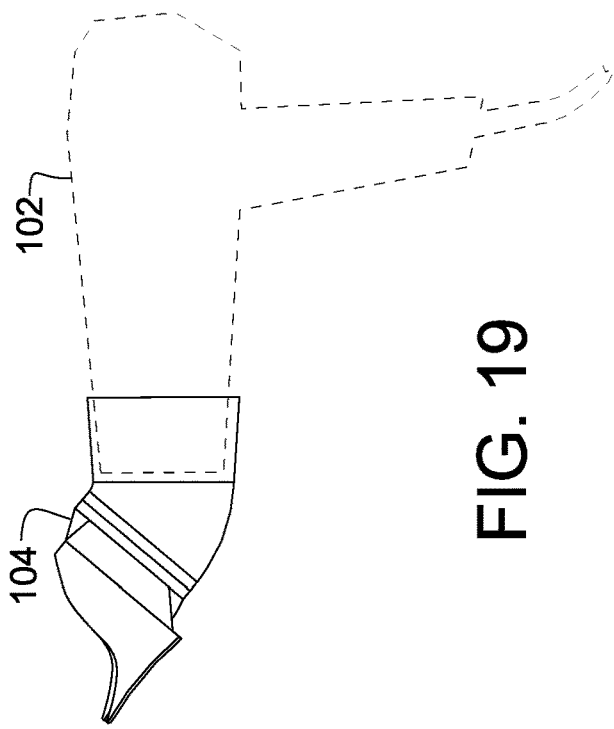
FIG. 19 shows the ectoparasite eradicating device affixed to the blow dryer.

Following is a detailed description of the airflow chamber 108 in the exemplary embodiment of the presently disclosed subject matter. FIGS. 9-11, 14 and 19-21 shows how the elements of the airflow chamber 108 interface to form a unitary part. As shown in FIGS. 11 and 19 The airflow chamber comprises a tapered universal collar 94, which is what affixes to the blow dryer 102. The tapered shape of the universal collar 94 matches the general shape of most blow dryer 102 nozzles allowing for a secure fit.

Figure 20:
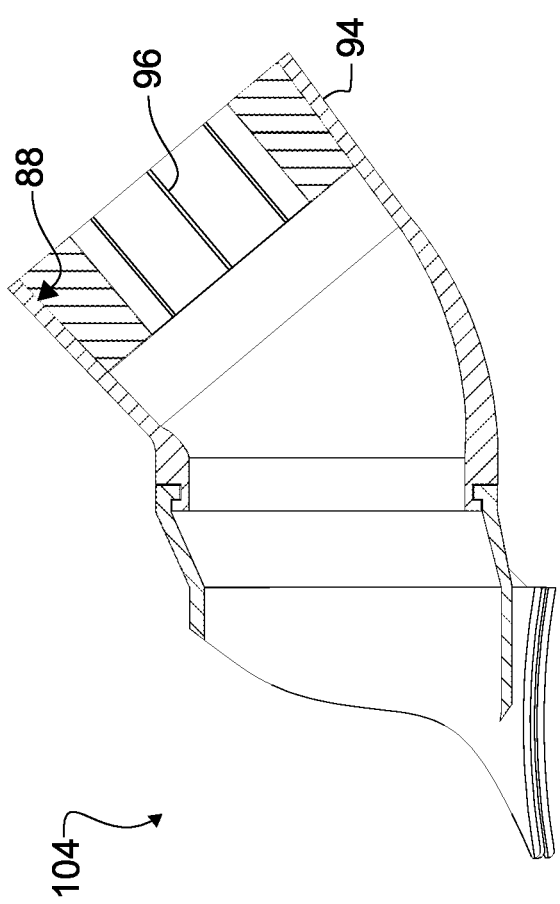
FIG. 20 shows an elevation cross sectional view of how the ribbed sleeve interfaces with the universal collar of the ectoparasite eradicating device.

As shown in FIGS. 19 and 20 shaping the universal collar 94 to match the general shape of a blow dryer 102 nozzle allows for full contact between the outer surface of the nozzle and the inner surface of the universal collar 88. The overall length of the universal collar 94 is of a length that allows the blow dryer 102 nozzle to be inserted into the universal collar 94 to a depth necessary to maintain a secure connection with the blow dryer 102 during the treatment process. The method chosen to affix the universal collar 94 to the blow dryer 102 nozzle will determine the internal diameter of the universal collar 94 at the insertion point.

Figure 21:
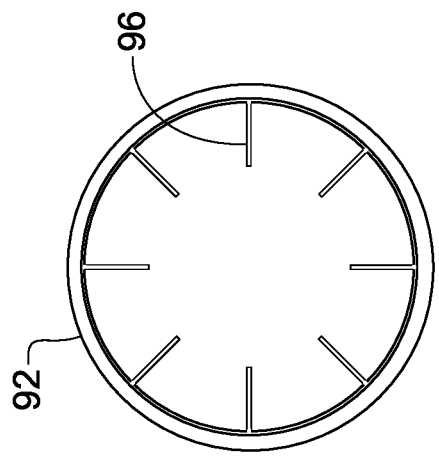
FIG. 21 is a top view of the ribbed sleeve interfacing with the universal collar.

In the embodiment of the presently disclosed subject matter the chosen method to affix the universal collar 94 to the blow dryer 102 nozzle is a friction connection using a silicon ribbed sleeve 96 inserted or molded to the interior surface of the universal collar 92 as shown in FIGS. 20 and 21.

Also, as shown in FIG. 20, the ribbed sleeve 96 does not extend the entire length of the universal collar 92. The formula of the silicon used to create the ribbed sleeve is not within the scope of the invention. However, the methods, shape and size of the ribbed sleeve 96 are within the scope of the invention. The silicon used to create the ribbed sleeve 96 is of a formula that will not cause the ribbed sleeve tear, deform, disintegrate under high temperatures and multiple uses over long periods of time. The shape, size length and material of the ribbed sleeve 96 is not limited to silicon. For example, in lieu of using a ribbed sleeve to hold the blow dryer 102 nozzle in place, a sleeve with a series of bumps could be used. The sleeve could extend the entire length of the universal collar, or a series of sleeves could be used. The scope of the material used to create the ribbed sleeve 96 extends to any substance that is flexible and elastic in nature.

Following is a detailed description of a method of lice and nit eradication using the ectoparasite eradication device 104 in the exemplary embodiment of the presently disclosed subject matter as shown in FIGS. 22-27.

Figure 26:
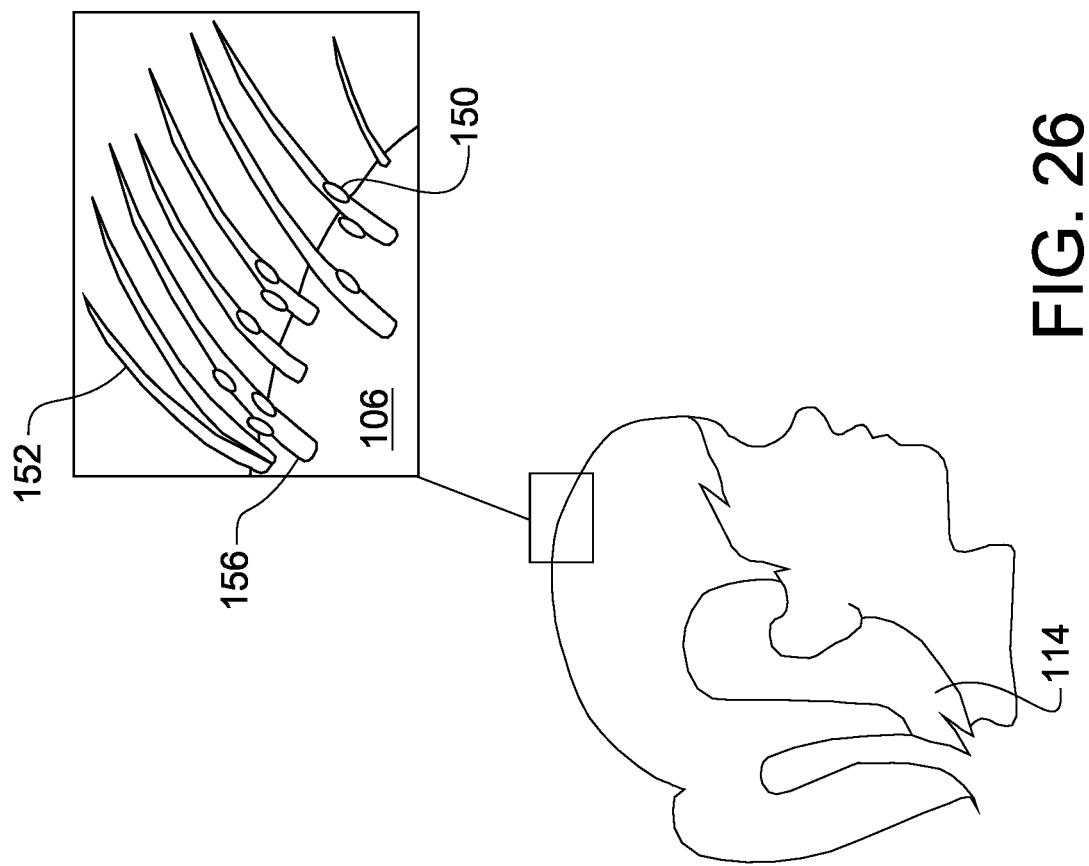
FIG. 26 is a visual representation of where the ectoparasites can be found on the hair shaft and scalp of a human head.
Figure 25:
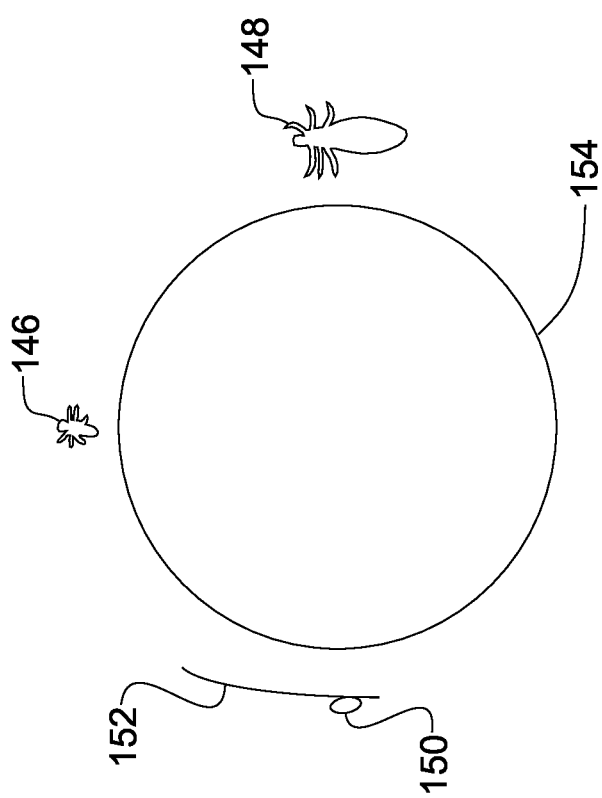
FIG. 25 shows the size of the ectoparasites at the three stages of life as it relates to the size of a 1 cent coin.
Figure 27:
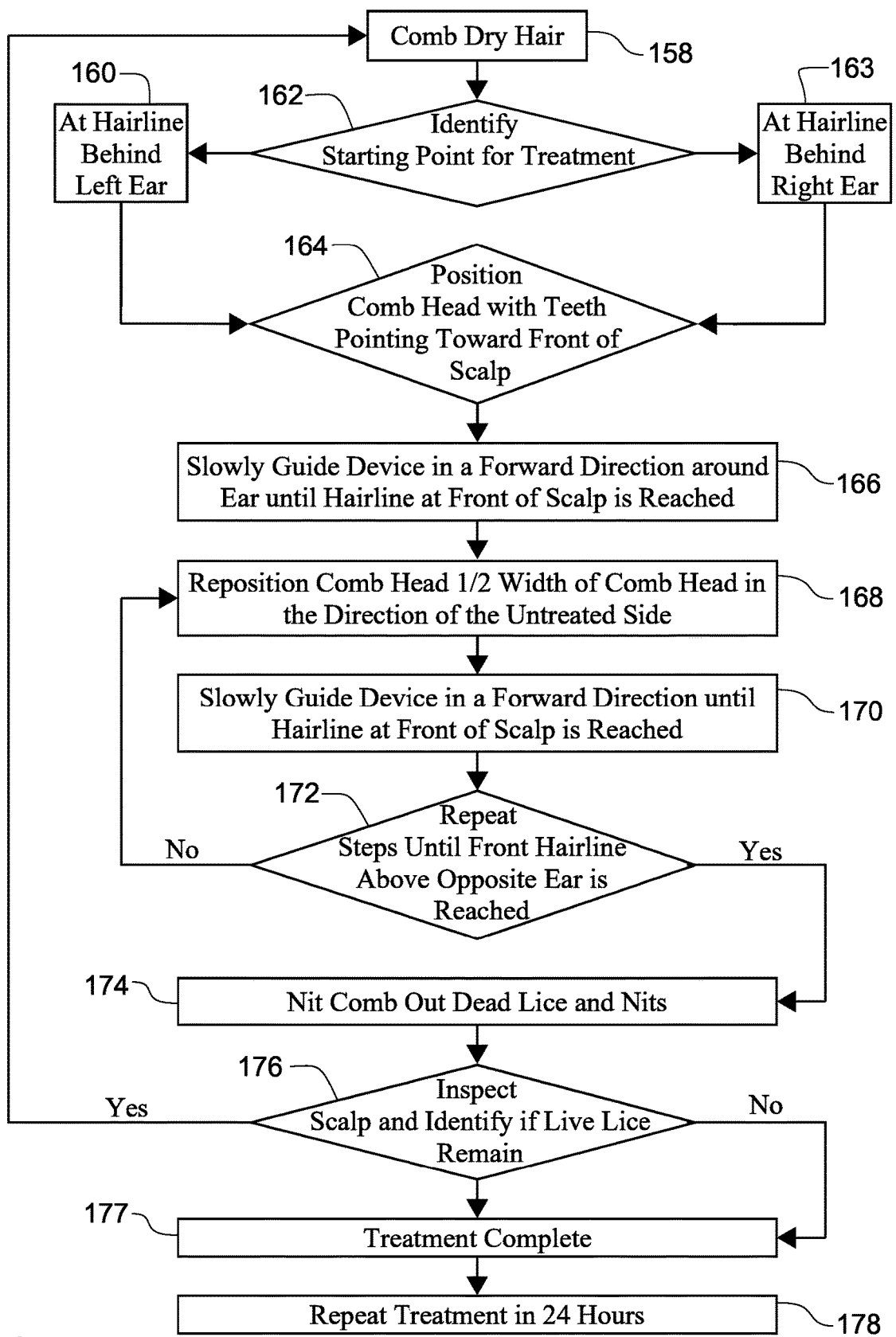
FIG. 27 is a detailed block diagram illustrating a method of using ectoparasite eradicating device according to one embodiment of the disclosure.

FIG. 25 shows the three stages of head lice, the egg (also referred to as nits) 150, the nymph 146, and the adult 148. Also shown is how the size of the lice at the various stages in life relates to a United States one cent coin 154. Head lice of the nymph 146 and Adult 148 stages feed on the blood of a host and typically live close to the human scalp 106, but they lay their eggs 150 on strands of hair 152 near the base of the hair shaft 156 as shown in FIG. 26. Lice and nits are most commonly found behind the ears and around the neckline of a human head 114 as shown in FIG. 26.

Figure 18:
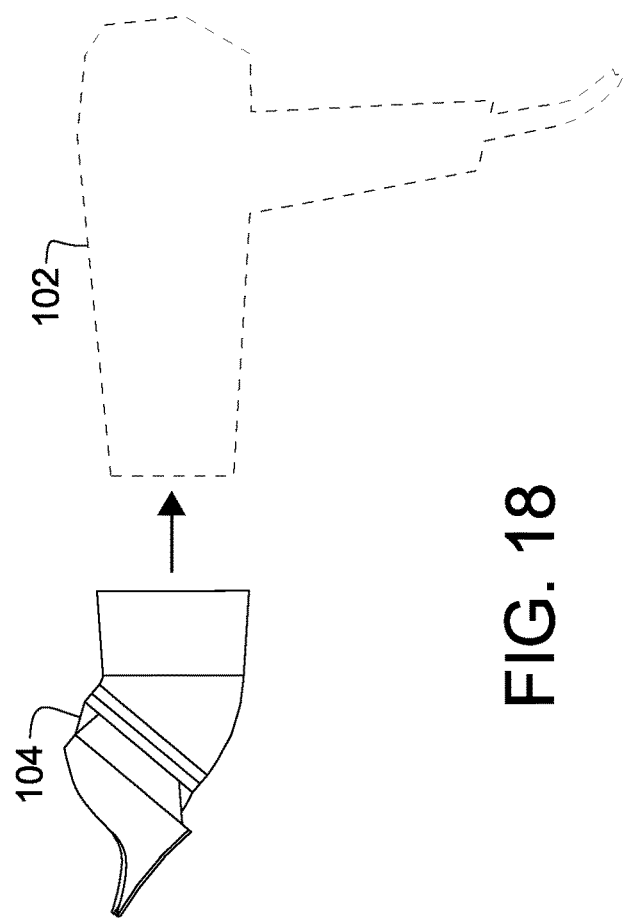
FIG. 18 shows the direction and location of where the ectoparasite eradicating device affixes to the blow dryer.

An exemplary method of treatment to eradicate the lice and nits is shown FIGS. 18, 19 and 22-27 of the presently disclosed subject matter. As shown in FIGS. 18 and 19, the ectoparasite eradicating device 104 shall be affixed to the blow dryer 102. Once the device 104 has been affixed to the blow dryer 102 and adjusted to the proper heat setting, the blow dryer can be turned on and the process for treatment can begin. The first step in the exemplary method of treatment disclosed is to comb through the hair of the actor to remove tangles, lift the hair and remove loose lice and nits 158. Once the hair has been combed though and the actor is ready for the next step, the starting position of where to begin the path for lice treatment needs to be identified 162. The starting position should begin at the back hairline, behind the left ear 160 or right ear 163. Once the location of the starting point has been identified, the bottom side of the set of combing teeth 76 shall be placed on the neck just prior to the hairline so that the set of combing teeth 76 are pointing toward the front of the scalp. Ensure that all combing teeth 76a-76f are making contact with the scalp and the airflow guide 74 is parallel to the scalp 106. Once the comb head 110 is placed properly, the device 104 can be guided slowly in a path around the ear, toward the hairline at the front of the scalp 166.

Figure 22:
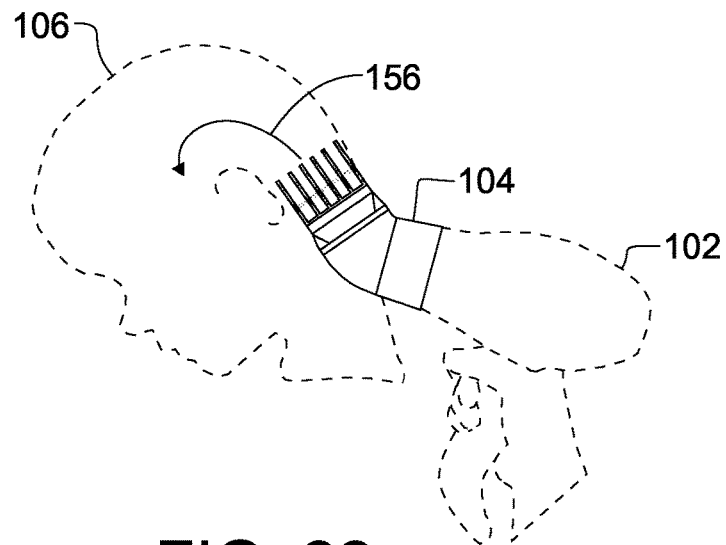
FIG. 22 shows the start position of an exemplary method for treatment using the ectoparasite eradicating device.
Figure 23:
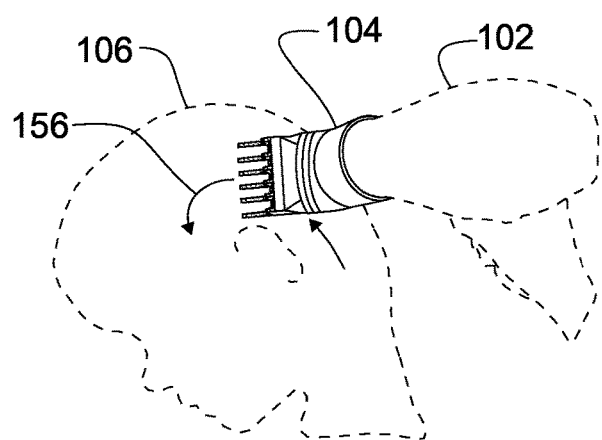
FIG. 23 shows the direction and path taken in the exemplary method for treatment shown in FIG. 22.
Figure 24:
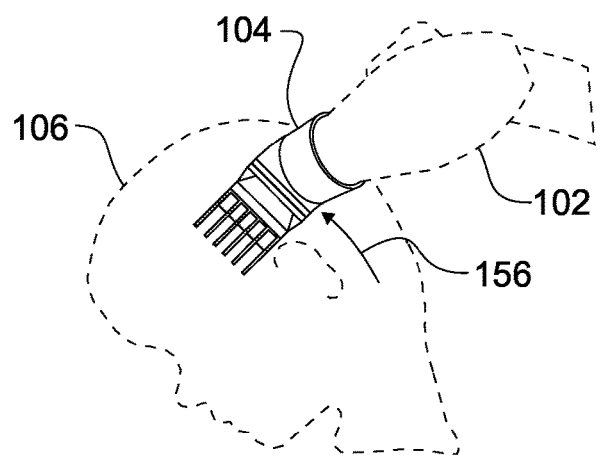
FIG. 24 shows the end position of the path taken in the exemplary method for treatment shown in FIG. 23.

FIGS. 22-24 provide a visual representation of an exemplary path of treatment and may be referenced the method of treatment is being described to add clarity to the method of treatment. FIG. 22 depicts the starting point for the path of treatment to be behind the actors left ear. FIG. 23 depicts a representation of the comb head being guided towards the hairline at the front of the scalp 106. FIG. 24 depicts the end point for the initial path of treatment as the comb head has reached the hairline at the front of the scalp 106. Also depicted in FIGS. 22-24 is a representation of the swiveling of the ectoparasite eradicating device 104 during treatment. As the blow dryer 102 is being rotated, for comfort of the user and to avoid contact with the actor by the handle or electrical cord of the blow dryer, the set of combing teeth 76 are able to maintain contact with the scalp 106 while the comb head 110 is being guided to the front hair line of the scalp 106. To improve the effectiveness of the process, as the device 104 is being guided the section of hair being treated shall be lifted to better expose the lice and nits to the heated air coming being coming out of the comb head 110. Once the comb head 110 as passed through the section of hair being held, the hair can be let down allowing it to pass under the comb head 110. As the treated hair is passing under the comb head 110, the next section of hair in front of the comb head shall be lifted. This method shall be continued until the comb head 110 has reached the hairline at the front of the scalp. Once the comb head 110 has reached the front of the scalp, the comb head shall be repositioned at the back of the scalp similarly to position of the comb head 110 for the first path of treatment, except the comb head 110 shall be moved ½ the width of the comb head 110 in the direction of the untreated hair 168. Once the comb head 110 is repositioned properly, the comb head 110 can be slowly guided toward the hairline at the front of the scalp 170; following the same procedures completed for the first path of treatment described above. These steps shall be repeated until the front hairline, above the ear on the opposite side of the head has been reached 172. Once the comb head 110 has passed through all the hair on the scalp and reached the end point, the hair shall be combed though to remove dead lice and nits 174. If live lice are found, the treatment process should be repeated as described above until the lice and nits have been eradicated. If no live lice have been identified, the lice treatment is complete 177. The lice treatment process shall be repeated as described above in 24 hours to ensure total eradication.

The method of treatment is not limited to the process shown in FIGS. 22-24 and 27. It may be necessary for the actor to bathe and wash their hair prior to starting the exemplary method shown herein to remove tangles, clean the hair and scalp, remove loose lice and nits or lift the hair to make it easier for the comb head 110 of the ectoparasite eradicating device 104 to be guided though the hair. It should be known that if the hair and scalp 106 do get wet prior to treatment that the hair and scalp 106 must be completely dried first. Also, depending on the actor being treated, some steps may need to be skipped, added, modified, or completed in reverse. It may be desirable to start the treatment path at a different location on the head. Although, less effective, treatment could begin in the middle of the scalp, at the top of the head. The path of treatment could begin at the hairline at the front of the scalp directing the comb head 110 toward the back of the head. The path of treatment could also be completed perpendicular to the exemplary path described in the present disclosure. It may be necessary to tip the actors head upside down if sections of hair can not be lifted to better expose the lice and eggs to the heated air.

The method of treatment described in FIGS. 22-24 and 27 is not limited to being completed with the help of an additional person to guide the comb head 110 through the hair. Due to the shape and swiveling configuration of the ectoparasite eradicating device 104, the method of treatment can be completed solo, by the actor.

While particular embodiments of the invention have been illustrated and described, various modifications and combinations can be made without departing from the spirit and scope of the invention. All such modifications, combinations, and equivalents are intended to be covered and claimed.

The invention claimed is:

1. An anti-ectoparasite apparatus, comprising:
   a conduit, having a first axis and a fixation portion for releasable attachment to a tube, and being configured to receive a flow of heated air;
   a rotatable sleeve joint; and
   a comb unit connected to the conduit via the rotatable sleeve joint, the comb unit comprising;
      a hollow shell configured to angularly redirect air from the first axis defined by the conduit, to a second axis angularly displaced from the first axis;
      at least three parallel plates configured as a comb, extending from the hollow shell, the at least three parallel plates each having a foot defining a lower concave boundary configured to contact skin and move along the skin with the hair extending from the skin into the comb, wherein the at least three parallel plates are aligned with the second axis; and
      a surface parallel to the second axis, displaced from the feet of the at least three parallel plates, and being configured to separate the heated air received from the conduit from the skin, having a deflector situated within a space between adjacent parallel plates,
      the at least three parallel plates and the surface being together configured to redirect the flow of heated air from the tube along the at least three parallel plates and the surface, and dependent on a rotational angle of the rotatable sleeve joint, and to interrupt a flow of heated air along an upper side of the surface to locally introduce vortices to heat the hair proximate to a root of the hair without burning the skin.

2. The anti-ectoparasite apparatus according to claim 1, wherein the heating of the hair is effective to kill insects, arthropods, and their eggs.

3. The anti-ectoparasite apparatus according to claim 2, wherein the heating of the hair is effective to kill *Pediculus humanus* and their eggs.

4. The anti-ectoparasite apparatus according to claim 1, wherein the fixation portion is configured for attachment to the tube comprising a blow dryer nozzle having a diameter between 1.4" and 2.5".

5. The anti-ectoparasite apparatus according to claim 1, wherein the first axis and the second axis differ by between 20° and 60°.

6. The anti-ectoparasite apparatus according to claim 1, wherein the first axis and the second axis differ by between 30° and 45°.

7. The anti-ectoparasite apparatus according to claim 1, wherein the at least three parallel plates comprise at least five intervening hot air flow spaces.

8. The anti-ectoparasite apparatus according to claim 1, wherein the surface defines a hollow space below the surface between the at least three parallel plates.

9. The anti-ectoparasite apparatus according to claim 8, wherein a flow of air over the surface is configured to induce a flow of cool air in the hollow space below the surface between the at least three parallel plates.

10. The anti-ectoparasite apparatus according to claim 1, wherein the fixation portion comprises a plurality of radial inwardly extending elastomer ribs.

11. The anti-ectoparasite apparatus according to claim 1, wherein the feet define an interrupted surface which is concave in two dimensions.

12. An anti-ectoparasite apparatus, comprising:
a tubular adapter configured to surround a blow dryer nozzle having a diameter of between 3 cm and 8 cm;
a rotatable sleeve, attached to the tubular adapter at an angle of between 15-60 degrees; and
a diffuser, linked to the rotatable sleeve, comprising:
a shroud;
a comb comprising at least three parallel sheets extending from the shroud, each sheet having a lower edge configured to contact skin and move along the skin with the at least three parallel sheets perpendicular to a skin surface; and
a plate parallel to the skin and intersecting the at least three parallel sheets displaced from the lower edge, defining a hot air space above the plate and cool air space below the plate, the plate having a flow deflection lip configured to interrupt a laminar air flow from the blow dryer above the plate,
the rotatable sleeve being configured to reposition the shroud with respect to the blow dryer to maintain the lower edges against the scalp over a range of relative angles of the shroud and the nozzle.

13. The anti-ectoparasite apparatus according to claim 12, wherein the apparatus is effective to kill insects and arthropods, and their eggs with hot air from the blow dryer.

14. The anti-ectoparasite apparatus according to claim 12, wherein the rotatable sleeve is configured to provide at an angle of 30-60 degrees between the shroud and the nozzle.

15. The anti-ectoparasite apparatus according to claim 12, wherein a flow of the hot air above the plate induces a flow of cool air below the plate.

16. The anti-ectoparasite apparatus according to claim 12, wherein the lower edges define a concave surface.

17. A method for treating an ectoparasite colonization, comprising:
attaching to a nozzle of a blow dryer a fixation portion of a conduit, the conduit having a first axis and being configured to receive a flow of heated air, the conduit being interfaced with a comb unit with a rotatable sleeve joint, the comb unit comprising;
a hollow shell which angularly redirects air from the blow dryer along the first axis, to a second axis angularly displaced from the first axis;
at least three parallel plates configured as a comb, extending from the hollow shell, the at least three parallel plates each having a foot defining a lower concave boundary configured to contact skin and move along the skin with the hair extending from the skin into the comb, wherein the at least three parallel plates are aligned with the second axis; and
a surface parallel to the second axis, displaced from the feet of the at least three parallel plates, which separates the heated air from the blow dryer from the skin, having a deflector situated within a space between adjacent parallel plates, the at least three parallel plates and the surface together redirecting the flow of heated air from the blow dryer along the at least three parallel plates and the surface, and dependent on a rotational angle of the rotatable sleeve joint, interrupting a flow of heated air along an upper side of the surface to locally introduce vortices;
placing the feet against a scalp with the blow dryer blowing hot air; and
displacing the feet along the scalp it heat the ectoparasites at a distance of 5 mm from the scalp to a temperature above 120° F. for at least 5 seconds, without burning the scalp.

18. The method according to claim 17, wherein said displacing comprises holding sections of hair up and combing the hair opposite to the direction of hair growth with the comb.

19. The method according to claim 17, further comprising holding the feet with the hot air blowing at the treatment site for 5 to 15 seconds.

20. The method according to claim 17, wherein the hair is dry prior to treatment.

* * * * *